US012747178B2

(12) United States Patent
Bachar et al.

(10) Patent No.: US 12,747,178 B2
(45) Date of Patent: Sep. 29, 2026

(54) GLASS MANUFACTURING APPARATUS AND METHODS OF MANUFACTURING GLASS

(71) Applicant: CORNING INCORPORATED, Corning, NY (US)

(72) Inventors: Amit Bachar, Rockville Centre, NY (US); Olus Naili Boratav, Ithaca, NY (US); Brendan William Glover, Corning, NY (US); Jiandong Meng, Painted Post, NY (US); Vinay A Patel, Lexington, KY (US); Adam Scott Regula, Horseheads, NY (US); Justin Shane Starkey, Painted Post, NY (US); Jeremy Walter Turner, Beaver Dams, NY (US)

(73) Assignee: CORNING INCORPORATED, Corning, NY (US)

(*) Notice: Subject to any disclaimer, the term of this patent is extended or adjusted under 35 U.S.C. 154(b) by 200 days.

(21) Appl. No.: 18/558,778

(22) PCT Filed: May 13, 2022

(86) PCT No.: PCT/US2022/029107
§ 371 (c)(1),
(2) Date: Nov. 3, 2023

(87) PCT Pub. No.: WO2022/245637
PCT Pub. Date: Nov. 24, 2022

(65) Prior Publication Data

US 2024/0228355 A1 Jul. 11, 2024

Related U.S. Application Data

(60) Provisional application No. 63/191,521, filed on May 21, 2021.

(51) Int. Cl.
*C03B 17/06* (2006.01)

(52) U.S. Cl.
CPC .......... *C03B 17/067* (2013.01); *C03B 17/064* (2013.01)

(58) Field of Classification Search
None
See application file for complete search history.

(56) References Cited

U.S. PATENT DOCUMENTS 3,775,080 A 11/1973 Brichard
4,853,017 A 8/1989 Eberle et al.
(Continued)

FOREIGN PATENT DOCUMENTS

CN 101096289 A 1/2008
CN 101821209 A 9/2010
(Continued)

OTHER PUBLICATIONS

International Search Report and Written Opinion of the International Searching Authority ;PCT/US2022/029107; dated Aug. 26, 2022; 12 pages; European Patent Office.
(Continued)

*Primary Examiner* — Jodi C Franklin

(57) ABSTRACT

Glass manufacturing apparatus comprise a forming body configured to draw a glass forming ribbon and positioned within an enclosure. Glass manufacturing apparatus comprise a first diffuser comprising a first inlet comprising a first inlet cross-sectional area and a first outlet comprising a first outlet cross-sectional area. The first outlet cross-sectional area is greater than the first inlet cross-sectional area. The first outlet is positioned within the enclosure. Methods of manufacturing a glass ribbon comprise flowing a glass-forming ribbon. Methods comprise flowing a first gas through the first inlet of a first diffuser at a first average inlet
(Continued)

velocity. Methods comprise flowing the first gas from the first diffuser through a first outlet of the first diffuser at a first average outlet velocity. The first average inlet velocity is greater than the first average outer velocity.

12 Claims, 7 Drawing Sheets

(56) References Cited

U.S. PATENT DOCUMENTS

| | | | | |
|---|---|---|---|---|
| 6,889,526 | B2 | 5/2005 | Pitbladdo | |
| 6,990,834 | B2 | 1/2006 | Pitbladdo | |
| 8,322,160 | B2 | 12/2012 | Nishiura et al. | |
| 8,397,536 | B2 | 3/2013 | Delia et al. | |
| 8,707,737 | B2 | 4/2014 | Chalk et al. | |
| 9,758,418 | B1 | 9/2017 | El-Kahlout et al. | |
| 2004/0154336 | A1 | 8/2004 | Pitbladdo | |
| 2006/0191294 | A1 | 8/2006 | Ganz et al. | |
| 2007/0068197 | A1 * | 3/2007 | Pitbladdo | C03B 17/067 65/324 |
| 2009/0314032 | A1 * | 12/2009 | Tomamoto | C03B 17/067 65/273 |
| 2010/0269542 | A1 | 10/2010 | Nishiura et al. | |
| 2011/0126591 | A1 | 6/2011 | Chalk et al. | |
| 2011/0277504 | A1 | 11/2011 | Pitbladdo | |
| 2012/0131956 | A1 | 5/2012 | Delia et al. | |
| 2016/0264445 | A1 * | 9/2016 | Pitbladdo | C03B 17/067 |
| 2019/0010074 | A1 | 1/2019 | Chen et al. | |
| 2019/0201948 | A1 | 7/2019 | Fu et al. | |
| 2019/0375668 | A1 * | 12/2019 | Bookbinder | C03C 3/078 |
| 2023/0137355 | A1 * | 5/2023 | Bressler | C03B 17/067 65/85 |

FOREIGN PATENT DOCUMENTS

| | | | | | |
|---|---|---|---|---|---|
| CN | 103183463 | B | * | 8/2017 | C03B 17/067 |
| DE | 102014116696 | A1 | | 5/2016 | |
| JP | 2003-026424 | A | | 1/2003 | |
| KR | 10-2013-0130758 | A | | 12/2013 | |
| TW | 201805248 | A | * | 2/2018 | C03B 17/064 |
| WO | WO-2004069757 | A2 | * | 8/2004 | C03B 17/067 |
| WO | WO-2007070825 | A2 | * | 6/2007 | C03B 17/067 |
| WO | 2007/132797 | A1 | | 11/2007 | |
| WO | WO-2013081827 | A1 | * | 6/2013 | C03B 17/064 |
| WO | 2017/020040 | A2 | | 2/2017 | |
| WO | 2017/103166 | A2 | | 6/2017 | |
| WO | 2017/103168 | A1 | | 6/2017 | |
| WO | WO-2017218501 | A1 | * | 12/2017 | C03B 17/068 |
| WO | WO-2018160452 | A1 | * | 9/2018 | C03C 3/087 |
| WO | 2018/232159 | A2 | | 12/2018 | |

OTHER PUBLICATIONS

Chinese Patent Application No. 202280042110.7, Office Action dated Aug. 2, 2025, 5 pages (English Translation only), Chinese Patent Office.

Deng et al., “Flow and Combustion Characteristics of Advanced Vortex Combustor with Hydrogen Fuel”, Journal of Aerospace Power, vol. 28, No. 1, 2013, 120-128, 9 pages.

* cited by examiner

GLASS MANUFACTURING APPARATUS AND METHODS OF MANUFACTURING GLASS

CROSS-REFERENCE TO RELATED APPLICATIONS

This is a national stage application under 35 U.S.C. § 371 of International Application No. PCT/US2022/029107, filed on May 13, 2022, which claims the benefit of priority under 35 U.S.C. § 119 of U.S. Provisional Application Ser. No. 63/191,521 filed on May 21, 2022, which are incorporated herein by reference in their entireties.

FIELD

The present disclosure relates generally to glass manufacturing apparatus and methods of manufacturing glass and, more particularly, to glass manufacturing apparatus comprising a gas sources methods of manufacturing glass comprising flowing gas.

BACKGROUND

Glass ribbons are commonly used, for example, in display applications, for example, liquid crystal displays (LCDs), electrophoretic displays (EPDs), organic light emitting diode displays (OLEDs), plasma display panels (PDPs), touch sensors, photovoltaics, or the like. Such displays can be incorporated, for example, into mobile phones, tablets, laptops, watches, wearables and/or touch capable monitors or displays. Glass ribbons are commonly fabricated by a flowing molten glass to a forming body whereby a glass web may be formed by a variety of ribbon forming processes, for example, slot draw, float, down-draw, fusion down-draw, rolling, tube drawing, or up-draw. The glass ribbon may be periodically separated into individual glass ribbons.

For a variety of applications, it is desirable to maintain one or more surfaces of the glass ribbon in a pristine condition that is substantially free of attached particles and other debris. For example, attached particles and other debris can cause unacceptable optical distortions in a display application and/or short circuit electronic components on the glass ribbon. Consequently, there is a need to prevent particles and other debris from attaching to the glass ribbon during the glass manufacturing process.

SUMMARY

The following presents a simplified summary of the disclosure to provide a basic understanding of some embodiments described in the detailed description.

Embodiments of the disclosure can provide methods of manufacturing glass that can produce glass ribbons with one or more high-quality, pristine surfaces. Flowing gas through the first diffuser can increase an enclosure pressure around a forming device and at least a portion of the glass-forming ribbon (e.g., travel path). Increasing the enclosure pressure can reduce an incidence of hydrogen blistering of the glass ribbon. Increasing pressure can reduce a flow of gas in a direction opposite a travel direction of the glass ribbon, for example, hot gas rising in down-draw forming devices in a so-called "stack" or "chimney" effect. Additionally, increasing the enclosure pressure can compensate for any leaks in the enclosure that could disrupt the quality of the glass ribbon. Reducing the flow of gas in a direction opposite a travel direction of the glass ribbon can reduce particles and other debris carried by such flows towards the glass ribbon. Providing the first diffuser within the enclosure can reduce particles and other debris within the enclosure, for example, when the glass-forming ribbon is in a viscous or viscoelastic state and may be more susceptible to contamination. Further, providing a clean (e.g., class 100 or cleaner) gas source to provide gas flowing through the first diffuser can reduce particles and/or debris on the surfaces of the glass ribbon. Providing an inert gas to flow through the first diffuser can prevent corrosion or other degradation of the glass manufacturing apparatus, which can reduce impurities in the glass ribbon from such byproducts. Controlling a flow rate of gas through a first diffuser can reduce the velocity (e.g., average velocity, maximum velocity) of gas flowing through the first outlet cross-sectional area and/or reduce an intensity of currents of the gas that could interfere with the quality of the glass ribbon.

Embodiments of the disclosure can provide a glass forming apparatus comprising a first diffuser that can provide technical benefits. Providing the first diffuser with a larger first outlet cross-sectional area than the corresponding first inlet cross-sectional area can decrease a velocity (e.g., average velocity, maximum velocity) of gas flowing through the first outlet cross-sectional area, for example, about 10% or less than a velocity gas flowing through the first inlet cross-sectional area. Providing a diffuser in accordance with embodiments of the disclosure can decrease the maximum velocity (e.g., maximum outlet velocity) of gas flowing through the first outlet cross-sectional area, which can reduce an intensity of currents of the gas that could interfere with the quality of the glass ribbon. Providing the first diffuser can enable a low pressure drop (e.g., from about 100 Pascals or less) along a gas path through a first inlet and the first diffuser with at least two changes in direction of about 90° or more, which can increase an efficiency of the diffuser. Providing the gas path with at least two changes in direction of about 90° or more can provide room for positioning of cooling tubes or other apparatus near the first diffuser without collision, which can make efficiency use of the limited space within the enclosure. Further, the first diffuser and/or cooling tubes can be positioned within a first interior area, which can further protect the glass ribbon from currents of the gas. Providing the diffuser such that an angle an angle between the travel plane and a direction normal to the first outlet cross-sectional area can be about 45° or less can help protect the glass-forming ribbon from currents of gas from the first diffuser.

In some embodiments, a glass manufacturing apparatus can comprise a forming body configured to draw a glass-forming ribbon along a travel plane in a travel direction. At least a portion of the forming body can be positioned within an enclosure. The glass manufacturing apparatus can comprise a first diffuser comprising a first inlet comprising a first inlet cross-sectional area and a first outlet comprising a first outlet cross-sectional area. The first outlet cross-sectional area can be greater than the first inlet cross-sectional area. The first outlet can be positioned within the enclosure. A gas source can be connected to the first inlet.

In further embodiments, the glass manufacturing apparatus can further comprise an inlet conduit connecting the first inlet of the first diffuser to the gas source. A gas path defined by the inlet conduit and the first diffuser can undergo at least two changes in direction of about 90° or more.

In even further embodiments, a change in direction of the at least two changes in direction can be positioned within the first diffuser.

In further embodiments, an area ratio of the first outlet cross-sectional area to the first inlet cross-sectional area can be in a range from about 2 to about 60.

In further embodiments, a cross-sectional area of the first diffuser can smoothly increase from the first inlet cross-sectional area to the first outlet cross-sectional area.

In further embodiments, an angle between the travel plane and a direction normal to the first outlet cross-sectional area can be about 45° or less.

In further embodiments, an enclosure area can be bounded by the enclosure and a first wall of a first housing extending into the enclosure. The first outlet can be positioned within a first interior area bounded within the first housing by at least the first wall.

In even further embodiments, the glass manufacturing apparatus can further comprise a plurality of cooling tubes. Each cooling tube of the plurality of cooling tubes can include a fluid outlet within the first interior area. Each cooling tube of the plurality of the tubes can be positioned to direct a cooling fluid toward the travel plane.

In even further embodiments, the first interior area can be in fluid communication with the enclosure area.

In even further embodiments, the glass manufacturing apparatus can further comprise a second diffuser comprising a second inlet comprising a second inlet cross-sectional area and a second outlet comprising a second outlet cross-sectional area greater than the second inlet cross-sectional area. The enclosure area can be further bounded by a second wall of a second housing extending into the enclosure. The second outlet can be positioned within a second interior area bounded within the second housing by at least the second wall.

In still further embodiments, the second interior area can be in fluid communication with the enclosure.

In still further embodiments, the travel plane can pass between the first housing and the second housing.

In further embodiments, at least a portion of the travel plane can be positioned within the enclosure.

In further embodiments, the first diffuser can comprise a plurality of first diffusers arranged in a row extending across the travel direction.

In some embodiments, a method of manufacturing a glass ribbon can comprise flowing a glass-forming ribbon along a travel plane in a travel direction. At least a portion of the glass-forming ribbon can travel within an enclosure. The glass-forming ribbon can comprise a first major surface and a second major surface opposite the first major surface. The method can comprise flowing a first gas through a first inlet of a first diffuser at a first average inlet velocity. The method can comprise flowing the first gas from the first diffuser through a first outlet of the first diffuser at a first average outlet velocity. A maximum first outlet velocity of the first gas flowing through the first outlet can be about 10 meters per second or less. The first average outlet velocity can be about 2 meters per second or less. The first average inlet velocity can be greater than the first average outlet velocity. The first diffuser and at least a portion of the glass-forming ribbon can be within the enclosure.

In further embodiments, the first average outlet velocity can be in a range from about 0.1 meters per second to about 1 meter per second.

In further embodiments, the maximum first outlet velocity can be in a range from about 1 meter per second to about 5 meters per second.

In further embodiments, an angle between the first major surface and the first gas flowing through the first outlet can be about 45° or less.

In further embodiments, the first gas flowing through the first outlet of the first diffuser can flow into a first interior area bounded within a first housing of the housing by at least a first wall. The first housing can extend into the enclosure. The first gas flowing into the first interior area can increase an enclosure pressure in an enclosure area bounded by the enclosure and the first wall.

In even further embodiments, the method can further comprise cooling at least a portion of the first wall by flowing a first cooling fluid within the first interior area.

In even further embodiments, the method can further comprise flowing a second gas through a second inlet of a second diffuser at a second average inlet velocity. The method can comprise flowing the second gas from the second diffuser through a second outlet of the second diffuser into a second interior area at a second average outlet velocity. The second average outlet velocity can be less than the second average inlet velocity. The second interior area can be bounded within a second housing by a second wall. The second housing can extend into the enclosure. The second gas flowing into the second interior area can increase the enclosure pressure in the enclosure area.

In still further embodiments, the method can further comprise cooling at least a portion of the second wall by flowing a second cooling fluid within the second interior area.

In still further embodiments, the glass-forming ribbon can pass between the first housing and the second housing.

In further embodiments, the first diffuser can comprise a plurality of first diffusers. A total flow rate of the first gas flowing through the first outlets of the plurality of first diffusers can be in a range from about 4 standard cubic meters per hour to about 100 standard cubic meters per hour.

In even further embodiments, the total flow rate of the first gas can be in a range from about 6 standard cubic meters per hour to about 30 standard cubic meters per hour.

In further embodiments, the flowing the first gas through the first inlet and flowing the first gas through the first diffuser can comprise flowing the first gas along a gas path defined by an inlet conduit and the first diffuser. The gas path can undergo at least two changes in direction of about 90° or more. A pressure drop along the gas path can be in a range from about 1 Pascal to about 100 Pascals.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, aspects, and advantages are better understood when the following detailed description is read with reference to the accompanying drawings, in which.

DETAILED DESCRIPTION

Figure 1:
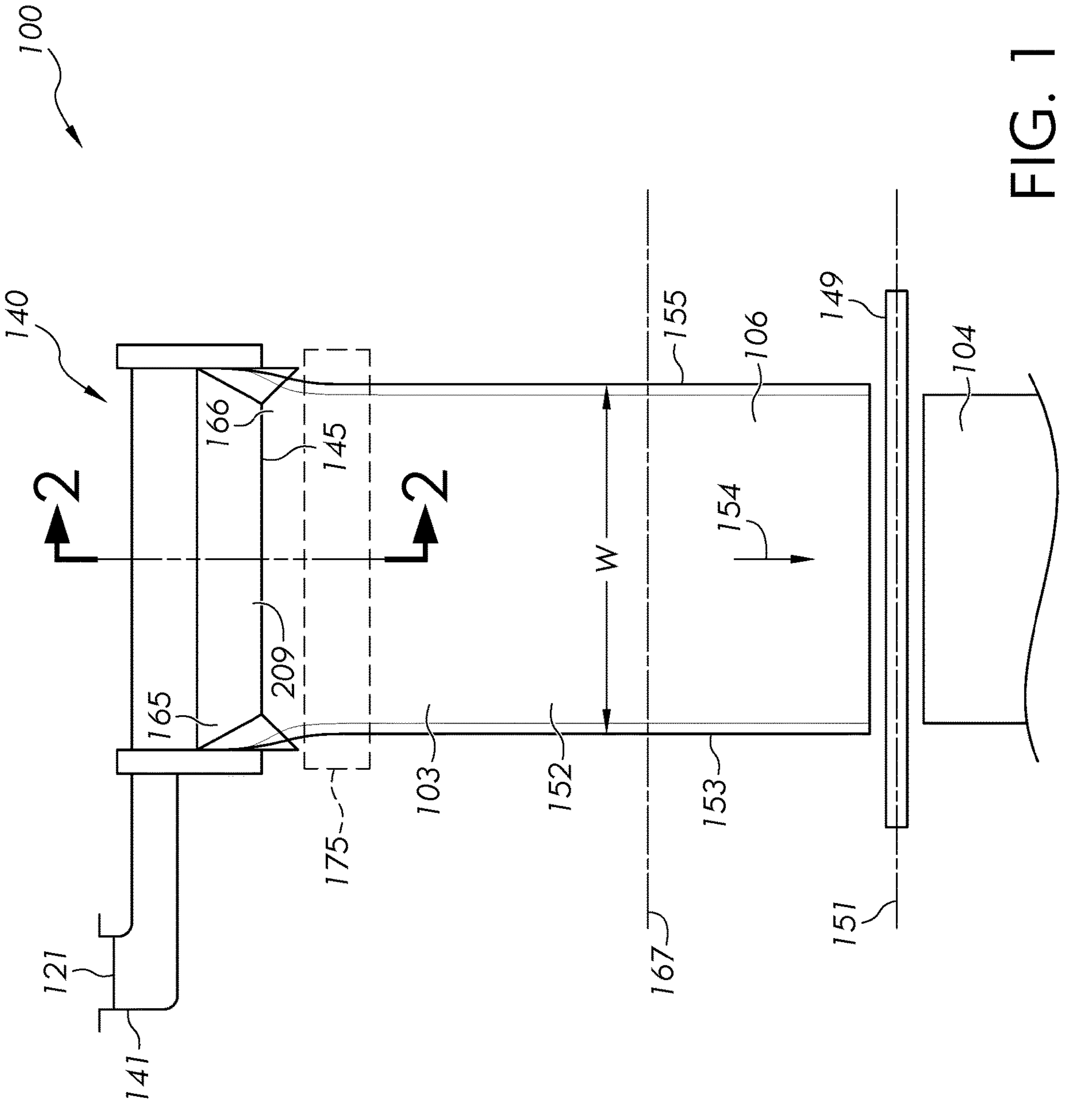
FIG. 1 schematically illustrates features of an example glass manufacturing apparatus in accordance with some embodiments of the disclosure.

Embodiments will now be described more fully hereinafter with reference to the accompanying drawings in which exemplary embodiments are shown. Whenever possible, the same reference numerals are used throughout the drawings to refer to the same or like parts. However, this disclosure may be embodied in many different forms and should not be construed as limited to the embodiments set forth herein.

Figure 2:
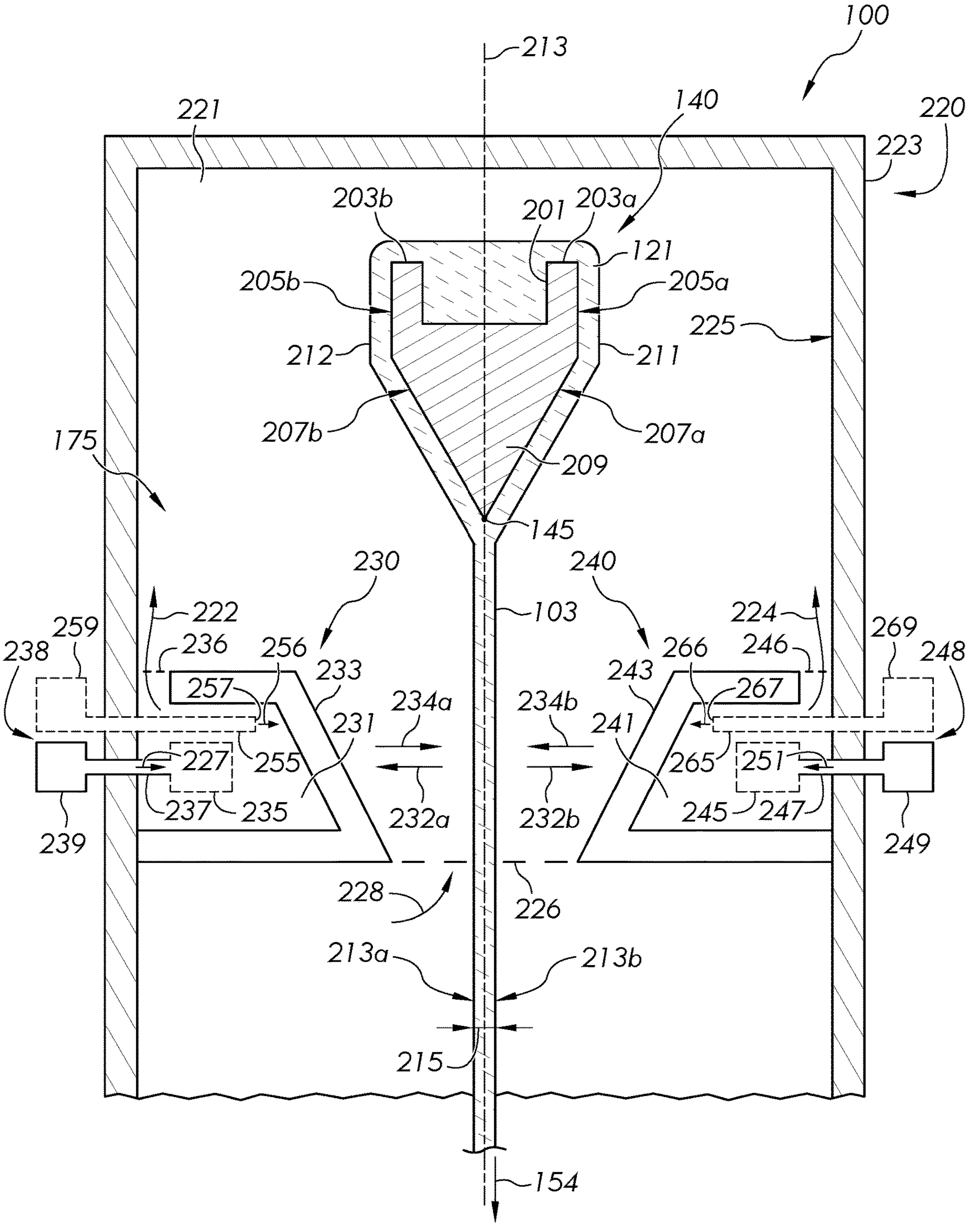
FIG. 2 shows a cross-sectional view of the glass manufacturing apparatus taken along line 2-2 of FIG. 1 in accordance with some embodiments of the disclosure.

The present disclosure relates to glass manufacturing apparatus and methods for manufacturing glass that may be employed in methods for manufacturing a glass or glass-ceramic article (e.g., a glass ribbon, ribbon of molten material) from a quantity of molten material. For example, FIGS. 1-2 illustrate a glass manufacturing apparatus comprising a down-draw apparatus (e.g., fusion down-draw apparatus) in the context of manufacturing a ribbon of molten material that can be cooled into a glass ribbon. Unless otherwise noted, a discussion of features of embodiments of the glass manufacturing apparatus can apply equally to corresponding features of other forming apparatuses used in the production of glass or glass-ceramic articles. Examples of glass forming apparatuses include a slot draw apparatus, a float bath apparatus, a down-draw apparatus, an up-draw apparatus, a press-rolling apparatus, or any other glass article manufacturing apparatus that can be used to form a glass article (e.g., glass ribbon, ribbon of molten material) from a quantity of molten material. In some embodiments, a glass article (e.g., glass ribbon, ribbon of molten material) from any of these processes may then be divided to provide a plurality of glass articles (e.g., separated glass ribbons, separated glass sheets) suitable for further processing into an application (e.g., a display application). For example, separated glass ribbons can be used in a wide range of applications comprising liquid crystal displays (LCDs), electrophoretic displays (EPDs), organic light emitting diode displays (OLEDs), plasma display panels (PDPs), touch sensors, photovoltaics, appliances (e.g., stovetops), or the like. Such displays can be incorporated, for example, into mobile phones, tablets, laptops, watches, wearables and/or touch capable monitors or displays.

FIGS. 1-2 illustrate a glass manufacturing apparatus used in a method of manufacturing glass. As schematically illustrated in FIG. 1, in some embodiments, a glass manufacturing apparatus 100 includes a forming body 140 designed to produce a glass-forming ribbon 103 from a quantity of molten material 121. As used herein, the term "ribbon of molten material" refers to molten material 121 after it is drawn from the forming body 140 but before the material attains a glassy state (e.g., at or below its glass transition temperature). In some embodiments, as shown in FIG. 1, the glass-forming ribbon 103 cools into a glass ribbon 106 below a glass transition zone 167 schematically depicted as a line. In some embodiments, the glass-forming ribbon 103 includes a central portion 152 disposed between opposite, thicker edge portions (e.g., beads) formed along a first outer edge 153 and a second outer edge 155 of the glass-forming ribbon 103. Additionally, in some embodiments, a glass sheet 104 can be separated from a glass ribbon 106 (e.g., a glass-forming ribbon 103 that has cooled to below its glass transition temperature) along a separation path 151 by a glass separator 149 (e.g., scribe, score wheel, laser).

In some embodiments, the glass manufacturing apparatus 100 can provide the molten material 121 to a forming body 140 through an inlet conduit 141 of the forming body 140. In further embodiments, although not shown, the inlet conduit can be fed molten material from one or more of a melting vessel, a fining vessel, a mixing chamber, and/or a delivery vessel, which may be arranged sequentially and/or connected by one or more conduits. For example, a delivery pipe (not shown) can be positioned to deliver molten material to the inlet conduit 141 of the forming body 140.

Various embodiments of forming bodies can be provided in accordance with features of the disclosure including a forming body with a wedge for fusion drawing the ribbon of molten material, a forming body with a slot to slot draw the ribbon of molten material, or a forming body provided with press rolls to press roll the ribbon of molten material from the forming body. By way of illustration, the forming body 140 shown and disclosed below are provided to fusion draw the molten material 121 off a bottom edge (e.g., root 145) of a forming wedge 209 to produce the glass-forming ribbon 103. For example, in some embodiments, the molten material 121 can be delivered from the inlet conduit 141 to the forming body 140. The molten material 121 can then be formed into the glass-forming ribbon 103 based at least in part on the structure of the forming body 140. For example, as shown, the molten material 121 can be drawn off the root 145 of the forming body 140 along a draw path extending in a travel direction 154 of the glass manufacturing apparatus 100.

FIG. 2 shows a cross-sectional view of the glass manufacturing apparatus 100 along line 2-2 of FIG. 1, according to various embodiments of the disclosure. In some embodiments, the forming body 140 can include a trough 201 oriented to receive the molten material 121 from the inlet conduit 141. The forming body 140 can further include the forming wedge 209 including a pair of downwardly inclined converging surface portions 207*a*, 207*b* extending between opposed ends 165, 166 (see FIG. 1) of the forming wedge 209. The pair of downwardly inclined converging surface portions 207*a*, 207*b* of the forming wedge 209 can converge along the travel direction 154 to intersect along a bottom edge of the forming wedge 209 to define the root 145 of the forming body 140. A travel plane 213 of the glass manufacturing apparatus 100 can extend through the root 145 along the travel direction 154. In some embodiments, the glass-forming ribbon 103 can be drawn in the travel direction 154 along the travel plane 213. As shown, the travel plane 213 can bisect the forming wedge 209 through the root 145 although, in some embodiments, the travel plane 213 can extend at other orientations relative to the root 145.

Additionally, in some embodiments, the molten material 121 flows into the trough 201 of the forming body 140 and then overflows from the trough 201 by simultaneously flowing over weirs 203*a*, 203*b* and downward over the outer surfaces 205*a*, 205*b* of the weirs 203*a*, 203*b*. Respective streams 211, 212 of molten material 121 flow along corresponding downwardly inclined converging surface portions 207*a*, 207*b* of the forming wedge 209 to be drawn off the root 145 of the forming body 140, where the streams 211, 212 of molten material 121 converge and fuse into the glass-forming ribbon 103. The glass-forming ribbon 103 can then be drawn off the root 145 in the travel plane 213 along the travel direction 154.

Figure 3:
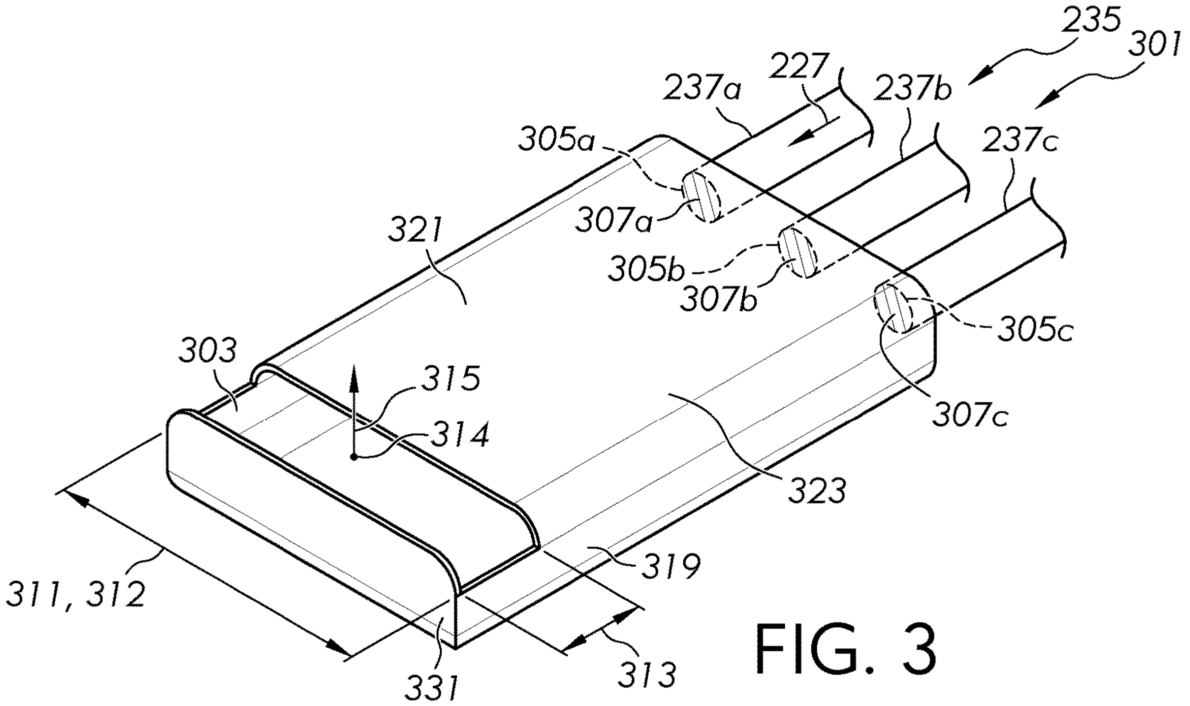
FIG. 3 illustrates a perspective view of a diffuser in accordance with some embodiments of the disclosure.

As shown in FIGS. 2-3, in some embodiments, the glass-forming ribbon 103 is drawn from the root 145 with a first major surface 213*a* of the glass-forming ribbon 103 and a second major surface 213*b* of the glass-forming ribbon 103 facing opposite directions and defining an average thickness 215 of the glass-forming ribbon 103. Exemplary molten materials, which may be free of lithia or not, can comprise soda lime molten material, aluminosilicate molten material, alkali-aluminosilicate molten material, borosilicate molten material, alkali-borosilicate molten material, alkali-alumniophosphosilicate molten material, or alkali-aluminoborosilicate glass molten material.

In some embodiments, as shown in FIG. 2, the glass manufacturing apparatus 100 comprises an enclosure 220 comprising an enclosure wall 223. In further embodiments, the enclosure wall can comprise a ceramic refractory material, for example, zircon, zirconia, mullite, alumina, or combinations thereof. In further embodiments, as shown, at least a portion of the forming body 140 (e.g., the entire forming body 140) can be positioned within the enclosure 220. In further embodiments, as shown, the enclosure wall 223 comprises an interior surface 225 facing the forming body 140. In even further embodiments, as shown, the enclosure 220 bounds an enclosure area 221. As used herein, the enclosure area is an at least partially enclosed area bounded at least in part by the enclosure wall 223, although the enclosure area 221 can be further bounded by other structures within the enclosure or extending into the enclosure. For example, as described below, the enclosure area 221 can be further bounded by a first housing 230 and/or a second housing 240. In still further embodiments, as shown, at least a portion of the forming body 140 (e.g., the entire forming body 140) is positioned within the enclosure area 221. In yet further embodiments, as shown, a portion of the travel plane 213 extending below the root 145 of the forming body 140 and/or a portion of the glass-forming ribbon 103 can be positioned with the enclosure area 221.

As shown in FIGS. 1-2, the glass manufacturing apparatus 100 comprises a flow apparatus 175. As shown in FIG. 2, the flow apparatus 175 comprises a first flow apparatus 238 and/or a second flow apparatus 248. The first flow apparatus 238 and the second flow apparatus 248 can be positioned on opposite sides of the travel plane 213 and the glass-forming ribbon 103. Although two flow apparatuses 238, 248 are shown, a single flow apparatus or more than two cooling apparatuses may be provided in further embodiments. The first flow apparatus 238 will be described more fully with the understanding that such description can also apply to one or more other flow apparatus such as the second flow apparatus 248.

In some embodiments, as shown in FIG. 2, the first flow apparatus 238 can comprise a first gas source 239 and the second flow apparatus 248 can comprise a second gas source 249. In some embodiments, the gas sources can comprise a pump, a blower, a cannister, a cartridge, a boiler, a compressor, and/or a pressure vessel. In further embodiments, the gas source may store the gas in a gas phase to be emitted in the gas phase. In some embodiments, the gas source may store the gas in a liquid phase and/or a solid phase that can transform to be emitted in a gas phase. In further embodiments, the emitted gas can comprise an inert gas, for example, air, nitrogen, argon, carbon dioxide, helium, hydrogen, nitrous oxide, neon, krypton, and/or combinations thereof. In further embodiments, the gas can meet an airborne particulate cleanliness class 100 (M3.5) or cleaner, as measured by U.S. Federal Standard 209E. Providing a gas source configured to emit a gas can provide a flow of pressurized gas through the flow apparatus (e.g., inlet conduit, diffuser) that can pressurize the enclosure area and/or reduce a flow of gas opposite the draw direction that might otherwise impair the quality of the glass-forming ribbon and/or glass ribbon. Further, providing a clean (e.g., class 100) air source to provide air flowing through the first diffuser can reduce particles and/or debris on the surfaces of the glass ribbon. Providing the emitted gas as an inert gas can prevent corrosion or other degradation of the glass manufacturing apparatus, which can reduce impurities in the glass ribbon from such byproducts.

In some embodiments, as shown in FIG. 2, the first flow apparatus 238 can comprise a first inlet conduit 237 configured to allow gas to flow therethrough in a first flow direction 227. An internal cross-sectional shape of the first inlet conduit 237 can comprise a curvilinear shape (e.g., elliptical, circular), a polygonal shape (e.g., triangular, quadrilateral (e.g., rectangular, square), hexagonal, octagonal), or a combination thereof Δn internal cross-sectional shape of the first inlet conduit 237 can be constant along a length of the first inlet conduit 237. The first inlet conduit 237 can comprise a maximum internal dimension perpendicular to the first flow direction 227 at a location along the first inlet conduit 237 accessible to gas flowing therein. For example, the maximum internal dimension of the first inlet conduit 237 can be about 0.1 mm or more, 0.4 mm or more, about 1 mm or more, about 3 mm or more, about 10 mm or more, about 100 mm or less, about 70 mm or less, about 50 mm or less, about 30 mm or less, or about 20 mm or less. In some embodiments, the maximum internal dimension of the first inlet conduit 237 can be in a range from about 0.1 mm to about 100 mm, 0.1 mm to about 70 mm, 0.4 mm to about 70 mm, from about 0.4 mm to about 50 mm, from about 1 mm to about 50 m, from about 1 mm to about 30 mm, from about 3 mm to about 30 mm, from about 10 mm to about 30 mm, from about 10 mm to about 20 mm, or any range or subrange therebetween. Similarly, the first inlet conduit 237 can comprise a minimum internal dimension perpendicular to the first flow direction 227 along the first inlet conduit 237 accessible to gas flowing therein. The minimum dimension of the first inlet conduit 237 can be within one or more of the ranges discussed above for the maximum internal dimension. In some embodiments, the maximum internal dimension can be substantially equal to the minimum internal dimension. The first inlet conduit 237 can comprise an internal cross-sectional area accessible to the gas that is perpendicular to the first flow direction 227 of about 0.01 $mm^2$ or more, about 0.1 $mm^2$, about 0.7 $mm^2$ or more, about 7 $mm^2$ or more, about 70 $mm^2$ or more, about 10,000 $mm^2$ or less, about 5,000 $mm^2$ or less, about 2,000 $mm^2$ or less, about 1,000 $mm^2$ or less, or about 300 $mm^2$ or less. In some embodiments, the first inlet conduit 237 can comprise an internal cross-sectional area accessible to the gas that is perpendicular to the first flow direction 227 in a range from about 0.01 $mm^2$ to about 10,000 $mm^2$, from about 0.1 $mm^2$ to about 10,000 $mm^2$, from about 0.1 $mm^2$ to about 5,000 $mm^2$, from about 0.7 $mm^2$ to about 5,000 $mm^2$, from about 0.7 $mm^2$ to about 2,000 $mm^2$, from about 7 $mm^2$ to about 2,000 $mm^2$, from about 7 $mm^2$ to about 1,000 $mm^2$, from about 70 $mm^2$ to about 1,000 $mm^2$, from about 70 $mm^2$ to about 300 $mm^2$, or any range or subrange therebetween. Providing an inlet conduit within one or more of the above maximum internal dimensions and/or internal cross-sectional areas can maximize the flow rate of gas through the inlet conduit without unnecessarily increasing a velocity of gas within the inlet and while making efficient use of space.

In some embodiments, a portion of the flow apparatus 175 (e.g., the first inlet conduit 237) can comprise a material that maintains its mechanical properties and dimensional stability at an operating temperature of the enclosure area 221. In some embodiments, a portion of the flow apparatus 175 (e.g., the first inlet conduit 237) can comprise alumina, barium titanate, boron nitride (BN), chromium disilicide ($CrSi_2$), lanthanum chromite, molybdenum disilicide ($MoSi_2$), silicon carbide (SiC), tungsten disilicide ($WSi_2$), yttrium oxide, zirconia ($ZrO_2$), SiAlON (i.e., a combination of alumina and silicon nitride and can have a chemical formula such as $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers), aluminum nitride (AlN), graphite, alumina ($Al_2O_3$), silicon nitride ($Si_3N_4$), fused quartz, mullite (i.e., a mineral comprising a combination of aluminum oxide and silicon dioxide), steel alloys (e.g., stainless steel), platinum, platinum alloys, rhodium, iridium, osmium, palladium, ruthenium, tungsten, molybdenum, gold, silver, chromium, a high-temperature stainless steel, for example, a 300-series SAE grade stainless steel, or a combination of two or more of the aforementioned materials.

In some embodiments, the first inlet conduit 237 can be in fluid communication with the first gas source 239, for example, directly connected to the first gas source (e.g., through an adaptor, a flow regulator). In further embodiments, the first inlet conduit 237 can be in fluid communication with the first gas source 239 by an additional conduit connecting the first gas source 239 to the first inlet conduit 237. The additional conduit can be flexible (e.g., rubber, silicone, cross-linked polyethylene, plasticized poly(vinyl chloride), articulated metal conduit). Providing a flexible additional conduit can enable relative movement between the gas source and the inlet conduit and/or the diffuser, for example, in directions 232*a* and 234*a* (see FIG. 2), which can allow the gas source to be mounted independent of a housing.

Figure 4:
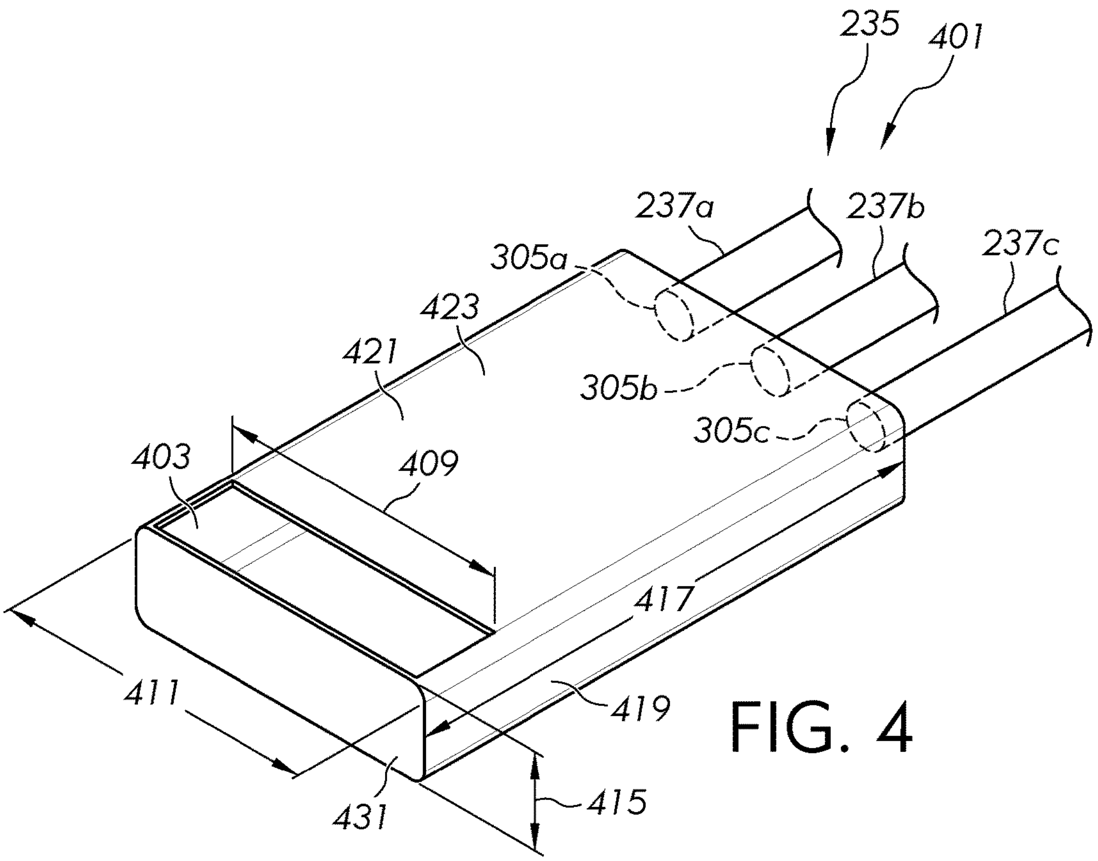
FIG. 4 illustrates a perspective view of a diffuser in accordance with some embodiments of the disclosure.

In some embodiments, as shown in FIGS. 5-13, the first inlet conduit 237 can comprise a single inlet conduit connected to a single diffuser (e.g., first diffuser 235). In some embodiments, as shown in FIGS. 3-4, the first inlet conduit can comprise a plurality of inlet conduits 237*a*-237*c*. The plurality of inlet conduits 237*a*-237*c* can be connected to a single diffuser (e.g., first diffuser 235). However, the number of inlet conduits in the plurality of inlet conduits need not be three (as shown in FIGS. 3-4 for a single diffuser) and the plurality of inlet conduits can be split between multiple diffusers, for example, when the first diffuser comprises a plurality of first diffusers. In some embodiments, the first diffuser 235 can comprise substantially the same material as a material of the first inlet conduit 237. Providing the same material for the first inlet conduit and the first diffuser can minimize warping or separation due to differential thermal expansion.

FIGS. 3-13 show enlarged views of the first diffuser 235 in accordance with embodiments of the disclosure. As discussed above for the first flow apparatus 238, the first diffuser 235 will be described more fully with the understanding that such description can also apply to one or more other diffusers such as a second diffuser 245 of the second flow apparatus 248.

In some embodiments, the first diffuser 235 (e.g., diffuser 301, 401, 501, 601, 701, 901, 1101, 1201, and/or 1301) comprises a first inlet 305 configured to receive (e.g., be connected to, be attached to) a portion (e.g., an end) of the first inlet conduit 237 and a first gas flowing through the first inlet conduit 237. For example, the first inlet conduit 237 can connect the first inlet 305 of the first diffuser 235 to the first gas source 239. The first gas source 239 can be in fluid communication with the first diffuser 235 (e.g., first inlet 305) via the first inlet conduit 237. As shown in FIGS. 5-9 and 12-13, the first inlet 305 of the first diffuser 235 can comprise a single inlet. In further embodiments, as shown in FIGS. 3-4, the first inlet of the first diffuser 235 can comprise a plurality of first inlets 305*a-c*, where each first inlet of the plurality of first inlets 305*a-c* is configured to receive (e.g., be connected to, be attached to) a portion (e.g., an end) of a corresponding inlet conduits 237*a-c*. However, the number of inlets need not be one (as shown in FIGS. 5-9 and 12-13) or 3 (as shown in FIGS. 3-4) and the number of inlets of any one diffuser may or may not be the same as a number of inlets of another diffuser of the same embodiment, if provided.

The first inlet 305 of the first diffuser 235 (e.g., diffuser 301, 401, 501, 601, 701, 901, 1101, 1201, and/or 1301) comprises an inlet cross-sectional area. Throughout the disclosure, an inlet cross-sectional area of a diffuser refers to a total cross-sectional area accessible to the first gas perpendicular to a flow of the first gas (e.g., first flow direction 227) through the inlet for all inlets of the corresponding diffuser. For example, with reference to FIG. 5, the inlet cross-sectional area for a diffuser 501 corresponds to the shaded area 507, which represents the cross-sectional area of the inlet 305 perpendicular to a flow of the first gas through the inlet 305 (e.g., first flow direction 227) accessible to the first gas. With reference to FIG. 3, the inlet cross-sectional area for a diffuser 301 corresponds to the sum of the three shaded areas 307*a*, 307*b*, and 307*c*, which represent the cross-sectional area of the corresponding inlet 305*a*, 305*b*, or 305*c* perpendicular to a flow of the first gas through the corresponding inlet 305*a*, 305*b*, or 305*c* (e.g., first flow direction 227) accessible to the first gas. As discussed above, the inlet 305 is a location configured to receive an inlet conduit 237 and/or the first gas flowing therein, and the inlet corresponds to where the first gas and/or inlet conduit 237 crosses into the diffuser 235. For example, with reference to FIG. 12, the inlet conduit 237 can pass through the inlet 305 and into the diffuser 1201, but the inlet 305 and the corresponding inlet cross-sectional area comprises the internal cross-sectional area of the inlet conduit 237 at the location where the inlet conduit 237 is received by the diffuser (e.g., expansion body 1221). In further embodiments, the first inlet cross-sectional area can be within one or more of the ranges discussed above for the internal cross-sectional area of the inlet conduit 237. A cross-sectional shape of the first inlet 305 can comprise a curvilinear shape (e.g., elliptical, circular), a polygonal shape (e.g., triangular, quadrilateral (e.g., rectangular, square), hexagonal, octagonal), or a combination thereof. The inlet 305 can comprise a maximum dimension 509 in a direction perpendicular to a direction (e.g., direction 227) of a flow of gas through the inlet 305. For example, the maximum dimension 509 can be within one or more of the ranges discussed above for the maximum internal dimension (e.g., internal diameter) of the inlet conduit 237 where the shaded area 507 represents the cross-sectional area of the inlet 305 perpendicular to a flow of the first gas through the inlet 305. In such examples, the shaded area 507 would be approximately equal to π multiplied by (the internal diameter/2)$^2$.

Figure 5:
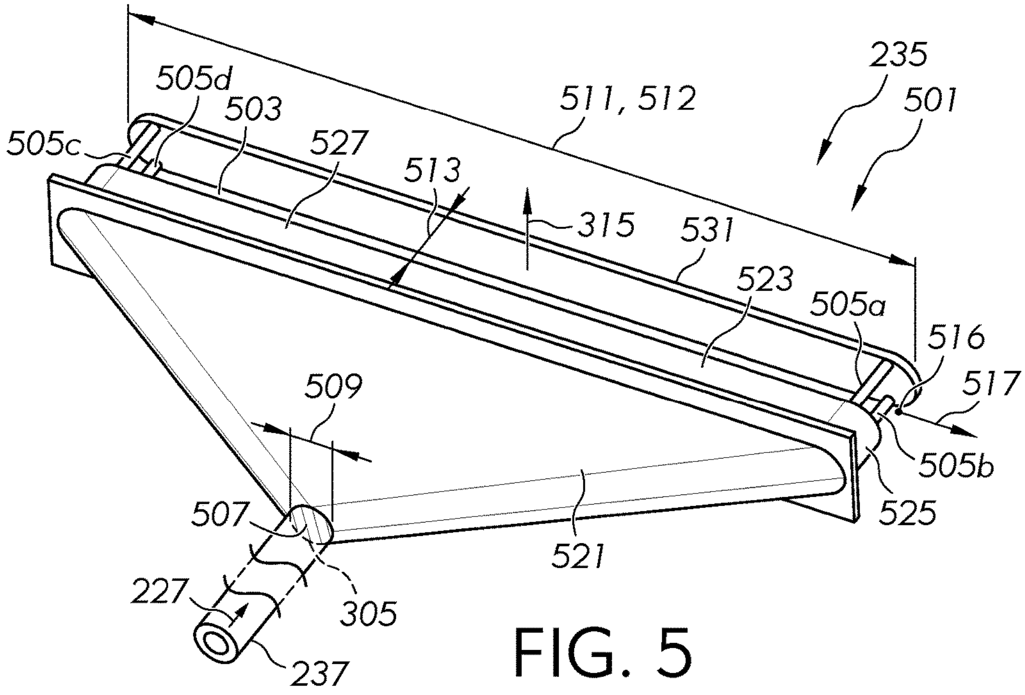
FIG. 5 illustrates a perspective view of a diffuser in accordance with some embodiments of the disclosure.

The first diffuser 235 (e.g., diffuser 301, 401, 501, 601, 701, 901, 1101, 1201, and/or 1301) comprises a first outlet 303, 403, 503, 603, 703, 903, 1103, 1203, and/or 1303. Throughout the disclosure, the first outlet corresponds to an opening in the diffuser through which the first gas exits the diffuser (e.g., into the enclosure area or an area in fluid communication with the enclosure area). The first outlet 303, 403, 503, 603, 703, 903, 1103, 1203, and/or 1303 of the diffuser 235 comprises a first outlet cross-sectional area. As used herein, an outlet cross-sectional area is defined as an area through which the first gas can exit the diffuser, where the outlet cross-sectional area is a substantially continuous area of a surface interpolated from the portions of an outer surface of the diffuser surrounding the outlet such that the outer surface of the diffuser and the surface interpolated therefrom form a combined surface defining a closed object and the combined surface is as smooth as possible. An area is substantially continuous area if a path between one sub-area of the area to another sub-area of the area travels through 0.5 mm or less of a portion of the diffuser, for example, by a support 505*a*-505*d* (see FIG. 5), not comprising the area. An area is continuous if a path between one sub-area of the area to another sub-area of the area can travel through the area without leaving the area. For example, with reference to FIG. 6, an outlet cross-sectional area is the area of a surface (e.g., shaded region 605) interpolated from the outer surface of the diffuser 601 comprising an outer surface of a main panel 627 of the diffuser 601, an end cap 631 of the diffuser 601, and a side panel 625 of the diffuser 601. Consequently, the first outlet cross-sectional area of the first outlet 603 corresponds to the area of the shaded region 605 since it is a continuous area that the first gas can flow through to exit the diffuser 601, and the surface corresponding to the shaded region 605 combined with the outer surface of the diffuser 601 defines a closed shape and forms a smooth surface. For example, with reference to FIG. 5, the outlet cross-sectional area is the area of a surface interpolated from the outer surface of the diffuser 501 comprising a main panel 527, a curved side panel 525, and an end cap 531 connected the rest of the diffuser 501 by supports 505*a-d*. Consequently, an outlet cross-sectional area of a first outlet 503 of the diffuser 501 comprises a substantially continuous area because sub-areas are separated by the supports 505*a-d* provided that the supports separate sub-areas by 0.5 mm or less (e.g., a path connecting a sub-area at the top of FIG. 5 of the first outlet 503 to a sub-area at the right-side of FIG. 5 travels through the support 505*a*). In some embodiments, the outlet cross-sectional area of the first outlet can comprise a curvilinear shape (e.g., elliptical, circular), a polygonal shape (e.g., triangular, quadrilateral (e.g., rectangular, square), hexagonal, octagonal), curved versions of the above cross-sections, or a combination thereof. For example, as shown in FIG. 4, the outlet cross-sectional area of an outlet 403 can comprise a rectangular cross-section. For example, as shown in FIG. 3, the outlet cross-sectional area of a first outlet 303 can comprise a rectangular cross-sectional area that is curved into a non-planar shape. For example, as shown in FIG. 5, the outlet cross-sectional area of a first outlet 503 can comprise substantially continuous area comprising a four rectangular cross-sections separated by the supports 505*a-d*, where two of the rectangular cross-sections are planar and two of the rectangular cross-sections are curved in a non-planar manner such that the outlet cross-sectional area comprises a substantially cylindrical cross-sectional area.

In some embodiments, the first outlet cross-sectional area can comprise an area within one or more of the ranges discussed above for the internal cross-sectional area of the first inlet conduit 237. In some embodiments, the first outlet cross-sectional area can be about 10 mm$^2$ or more, about 100 mm$^2$, about 300 mm$^2$ or more, about 600 mm$^2$ or more, about 1,000 mm$^2$ or more, about 3,000 mm$^2$ or more, about 100,000 mm$^2$ or less, about 60,000 mm$^2$ or less, about 30,000 mm$^2$ or less, about 10,000 mm$^2$ or less, or about 5,000 mm$^2$ or less. In some embodiments, the first outlet cross-sectional area can be in a range from about 10 mm$^2$ to about 100,000 mm$^2$, from about 10 mm$^2$ to about 60,000 mm$^2$, from about 100 mm$^2$ to about 60,000 mm$^2$, from about 100 mm$^2$ to about 30,000 mm$^2$, from about 300 mm$^2$ to about 30,000 mm$^2$, from about 300 mm$^2$ to about 10,000 mm$^2$, from about 600 mm$^2$ to about 10,000 mm$^2$, from about 600 mm$^2$ to about 5,000 mm$^2$, from about 1,000 mm$^2$ to about 5,000 mm$^2$, from about 3,000 mm$^2$ to about 5,000 mm$^2$, or any range or subrange therebetween.

Figure 6:
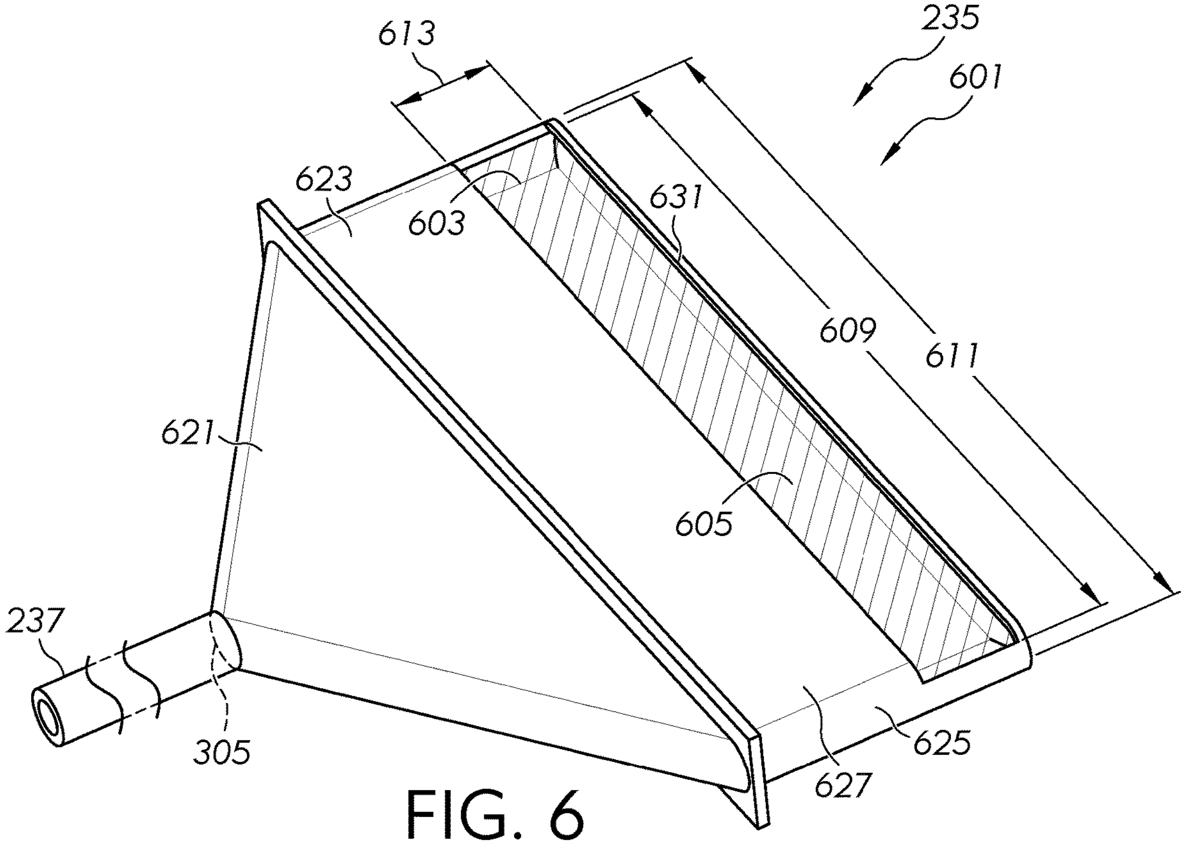
FIG. 6 illustrates a perspective view of a diffuser in accordance with some embodiments of the disclosure.

In some embodiments, the outlet cross-sectional area can correspond to one or more quadrilateral areas. As shown in FIGS. 3 and 5, a length 312 or 512 of the outlet 303 or 503 or the outlet cross-sectional area can be substantially equal to a width 311 or 511 of the diffuser 301 or 501. In further embodiments, as shown in FIGS. 4 and 6, a length 409 or 609 of the outlet 403 or 603 or the outlet cross-sectional area can be less than a width 411 or 611 of the diffuser 401 or 601. A length of the outlet as a percentage of the width of the diffuser can be about 50% or more, about 75% or more, about 80% or more, about 85% or more, about 99% or less, about 95% or less, or about 90% or less. In some embodiments, a length of the outlet as a percentage of the width of the diffuser can be in a range from about 50% to about 99%, from about 75% to about 99%, from about 75% to about 95%, from about 80% to about 95%, from about 80% to about 90%, from about 85% to about 90%, or any range or subrange therebetween. A length and/or a width of the outlet can be about 1 mm or more, about 5 mm or more, about 10 mm, about 20 mm or more, about 40 mm or more, about 500 mm or less, about 200 mm or less, about 100 mm or less, about 80 mm, or about 60 mm or less. In some embodiments, a length of the outlet can be in a range from about 1 mm to about 500 mm, from about 5 mm to about 500 mm, from about 5 mm to about 200 mm, from about 10 mm to about 200 mm, from about 10 mm to about 100 mm, from about 20 mm to about 100 mm, from about 20 mm to about 80 mm, from about 40 mm to about 80 mm, from about 40 mm to about 60 mm, or any range or subrange therebetween. In some embodiments, as shown in FIGS. 3 and 5-6 the outlet 303, 503, or 603 comprises a width 313, 513, or 613 that can be less than the corresponding length 312, 512, or 609. In further embodiments, the width of the outlet can be within one more of the ranges described above for the length of the outlet.

The first outlet cross-sectional area of the first diffuser is greater than the first inlet cross-sectional area. In some embodiments, an area ratio of the first outlet cross-sectional area of the first diffuser to a first inlet cross-sectional area of the first diffuser can be about 1.01 or more, about 1.1 or more, about 1.5 or more, about 2 or more, about 4 or more, about 8 or more, about 12 or more, about 100 or less, about 60 or less, about 40 or less, about 30 or less, or about 20 or less. In some embodiments, an area ratio of the first outlet cross-sectional area of the first diffuser to a first inlet cross-sectional area of the first diffuser can be in a range from about 1.01 to about 100, from about 1.10 to about 100, from about 1.1 to about 60, from about 1.5 to about 60, from about 1.5 to about 60, from about 2 to about 60, from about 2 to about 40, from about 4 to about 40, from about 4 to about 30, from about 8 to about 30, from about 8 to about 20, from about 16 to about 20, or any range or subrange therebetween. In some embodiments, an area ratio of the first outlet cross-sectional area of the first diffuser to a first inlet cross-sectional area of the first diffuser can be in a range from about 8 to about 40, from about from about 16 to 40, from 16 to 30, or any range or subrange therebetween. Providing an area ratio greater than 1 can decrease a velocity of the gas flowing out of the diffuser (e.g., outlet), which can reduce an intensity of currents of the gas that could interfere with the quality of the glass ribbon.

As shown in FIGS. 3 and 4, the outlet cross-sectional area of the first outlet can comprise a direction 315 normal to the outlet cross-sectional area. As used herein, a direction normal to a plane is defined by a cross-product of the vectors defining the plane. As used herein, a direction normal to a non-planar surface is calculated from a planar approximation of the surface at a location on the surface closest to the centroid of the surface. As used herein, a centroid of a surface is a geometric center of the surface calculated as an average position of the surface. Throughout the disclosure, a point on a surface closest to a location is measured using the Euclidian distance in three-dimensions (e.g., $\sqrt{(\Delta x^2+\Delta y^2+\Delta z^2)}$). For example, with reference to FIG. 3, a direction 315 normal to the first outlet cross-sectional area of the first outlet 303 is normal to a planar approximation of the surface at a location 314 on the surface of the first outlet cross-sectional area closest to a centroid of the first outlet cross-sectional area. If two or more points on the first outlet cross-sectional area are equidistant from the centroid, then the direction normal to the surface is measured from the point on the surface that is the most centered on the first outlet cross-sectional area (i.e., pairs of distances from the edges of the outlet cross-sectional area to the point are the most similar). For example, with reference to the area between supports 505*a* and 505*b* in FIG. 5 can be a substantially circular cylinder, and the direction 517 normal to the area is determined, at point 516 since point 516 is the most centered on the corresponding area, even though a line of points are equidistant from a centroid of the sub-area. As shown in FIG. 5, a sub-area of the first outlet cross-sectional area of the outlet 503 can comprise a direction 517 normal to the sub-area. With reference to FIG. 5, a direction normal to the first outlet cross-sectional area can be in both the direction 315 shown and another direction opposite the direction 315. Throughout the disclosure, a direction between a direction normal to a surface and a plane is defined as an angle between 0° and 90°, which can be obtained by subtracting or adding a multiple of 180° for angles above or below the range of 0° to 90°, respectively (e.g., $|\Theta|$, $|180°-\Theta|$, $|\Theta-180°|$). An angle between the travel plane 213 and a direction 315 normal to the first outer cross-sectional area can be about 45° or less, about 30° or less, about 20° or less, or about 0° or more, about 5° or more, about 10° or more. In some embodiments, an angle between the travel plane 213 and a direction 315 normal to the first outer cross-sectional area can be in a range from about 0° to about 45°, from about 0° to about 30°, from about 5° to about 30°, from about 5° to about 20°, from about 10° to about 20°, or any range or subrange therebetween. An angle between a direction 315 normal to a sub-area of the first outlet cross-sectional area and the travel plane 213 can be within one or more of the angles described above. For example, each sub-area of the first outlet cross-sectional area of the first diffuser can comprise an angle between a direction 315 normal to the corresponding sub-area of the first outlet cross-sectional area and the travel plane 213 within one or more of the angles described above. Providing a low angle between a direction normal to the outlet cross-sectional area and the travel plane 213 can reduce currents of the gas from the first diffuser 235 from impinging the travel plane 213 and/or the glass-forming ribbon 103 (e.g., first major surface 213*a*).

Throughout the disclosure, a velocity profile of the first gas flowing through the first outlet (e.g., first outlet cross-sectional area) of the first diffuser can be measured by taking multiple measurements of a velocity of the gas a different orientations and/or positions relative to the first outlet (e.g., first outlet cross-sectional area) of the first diffuser, for example, using a mass flow meter (e.g., thermal mass flow meter, Pitot tube flow meter, Coriolis mass flow meter). A direction of the first gas flowing through the first outlet (e.g., first outlet cross-sectional area) can be calculated as an average velocity-weighted direction of the first gas flowing through the first outlet. For example, with reference to FIG. 3, it is expected that a velocity profile of the first gas flowing through the first outlet 303 will be substantially symmetric along the direction of the length 312 of the outlet because of the symmetry of the diffuser 301 and/or the first outlet 303, which means that the direction (e.g., average direction) of the first gas flowing through the first outlet would be in the direction 315. In some embodiments, a direction of the first gas flowing through the first outlet (e.g., first outlet cross-sectional area) can be measured as two opposite directions, as is expected to be the case for the diffuser 501 shown in FIG. 5, where an average velocity-weighted direction through the outlet 503 (e.g., first outlet cross-sectional area) is expected to be 0. In some embodiments, a plurality of directions can be reported for the first gas flowing through the first outlet (e.g., first outlet cross-sectional area) by dividing the first outlet cross-sectional area into a plurality of sub-areas and then calculating the average velocity-weighted direction of the first gas through the corresponding sub-direction. In further embodiments, an angle between the first major surface 213*a* of the glass-forming ribbon 103 (e.g., travel plane 213) and the direction of the first gas flowing through the first outlet can be within one or more of the ranges discussed above for the angle between a direction normal to the first outlet and the travel plane. Providing an end cap (e.g., end cap 331, 431, 531, 631, 731, 931, 1131, 1231, and/or 1331) can change a direction of the first gas flowing through the first diffuser such that the first gas flowing from the first outlet can form a low angle with the travel plane 213 and/or the glass-forming ribbon 103 (e.g., first major surface 213*a*) can reduce currents of the first gas from impinging the travel plane 213 and/or the glass-forming ribbon 103.

In some embodiments, the first outlet cross-sectional area can be completely consisting entirely of gas. However, in some embodiments, the first outlet cross-sectional area can comprise a porous component, for example a porous metal filter or a porous ceramic filter, that can further diffuse the first gas passing through it. Exemplary embodiments of materials for the porous component include stainless steel (e.g., 300-series SAE grade stainless steel), titanium, alumina, mullite, and silicon carbide. In further embodiments, the porous component, if present, is permeable to the first gas and can comprise an effective pore size of about 1 micrometer (μm) or more, about 5 μm or more, about 30 μm or more, about 60 μm or more, about 500 μm or less, about 200 μm or less, or about 100 μm or less. As used herein, effective pore size of the porous component is measured as the mean pore size from capillary flow porometer in accordance with ASTM F316-03(2019) applied to the porous component. In further embodiments, the porous component can be permeable to the first gas and comprise an effective pore size from 1 μm to about 500 μm, from about 1 μm to about 200 μm, from about 5 μm to about 200 μm, from about 5 μm to about 100 μm, from about 30 μm to about 100 μm, from about 60 μm to about 100 μm, or any range or subrange therebetween. Providing a porous component can improve the cleanness of the first gas flowing through the outlet of the diffuser and can further decrease air currents.

In some embodiments, as shown in FIGS. 3-4, the diffuser 301 or 401 can comprise a main body 323 or 423 comprising a first inlet (e.g., plurality of first inlets 305*a-c*) and a first outlet 303 or 403. In further embodiments, as shown in FIG. 3, a cross-sectional area of the diffuser 301 perpendicular to the direction 227 of the first gas flowing through the inlet can be substantially constant. As shown, the cross-sectional area of the diffuser can be similar (e.g., identical, scaled) to a shape of the end cap 331. The cross-sectional area of the diffuser perpendicular to the direction 227 of the first gas flowing through the inlet can comprise a curvilinear shape (e.g., elliptical, circular), a polygonal shape (e.g., triangular, quadrilateral (e.g., rectangular, square), hexagonal, octagonal), or a combination thereof. For example, as shown in FIGS. 3-4, the cross-sectional area can comprise a rounded polygon (e.g., quadrilateral) with the top defined by a flat main panel 321 or 421 and a curved side panel 319 or 419 while the bottom is also curved because of the curved side panel 319 or 419.

In some embodiments, as shown in FIGS. 5-6, the diffuser 501 or 601 can comprise an expansion body 521 or 621 connecting the inlet 305 to a main body 523 or 623 of the diffuser 501 or 601. As shown in FIG. 5, a cross-sectional area of the expansion body 521 perpendicular to the direction 227 of the first gas through the inlet 305 can increase (e.g., smoothly increase, monotonically increase, smoothly monotonically increase, continuously increase, smoothly continuously increase) as a distance from the inlet 305 increases, for example, from the first inlet cross-sectional are (e.g., first inlet 305) to the first outlet cross-sectional area (e.g., first outlet 503 or 603). For example, the outlet cross-sectional area to be greater than an inlet cross-sectional area because the cross-sectional area of the expansion body increases in the direction of the first gas through the inlet. Throughout the disclosure, a cross-sectional area smoothly increases in a direction if the cross-sectional area increases and changes in the cross-sectional area are smooth (e.g., gradual) rather than abrupt (e.g., step) changes in cross-sectional area. For example, with reference to FIG. 5, the cross-sectional area of the expansion body 521 smoothly increases in the direction 227 because the cross-sectional area increases for a portion of the length of the expansion body 521 in the direction 227 and does so gradually without any abrupt changes. Throughout the disclosure, a cross-sectional area monotonically increases in a direction if the cross-sectional area increases for a portion and for the rest of the time either stays the same, increase, or a combination thereof (i.e., the cross-sectional area increases but never decreases in the direction). For example, with reference to FIG. 5, the cross-sectional area of the expansion body 521 monotonically increases in the direction 227 because the cross-sectional area increases for the entire length of the expansion body 521 in the direction 227 and does so without ever decreasing. Throughout the disclosure, the cross-sectional area continuously increases when the cross-sectional area only increases in the direction. For example, with reference to FIG. 5, the cross-sectional area of the expansion body 521 continuously increases in the direction 227 because the cross-sectional area increases for the entire length of the expansion body 521 in the direction 227.

Figure 7:
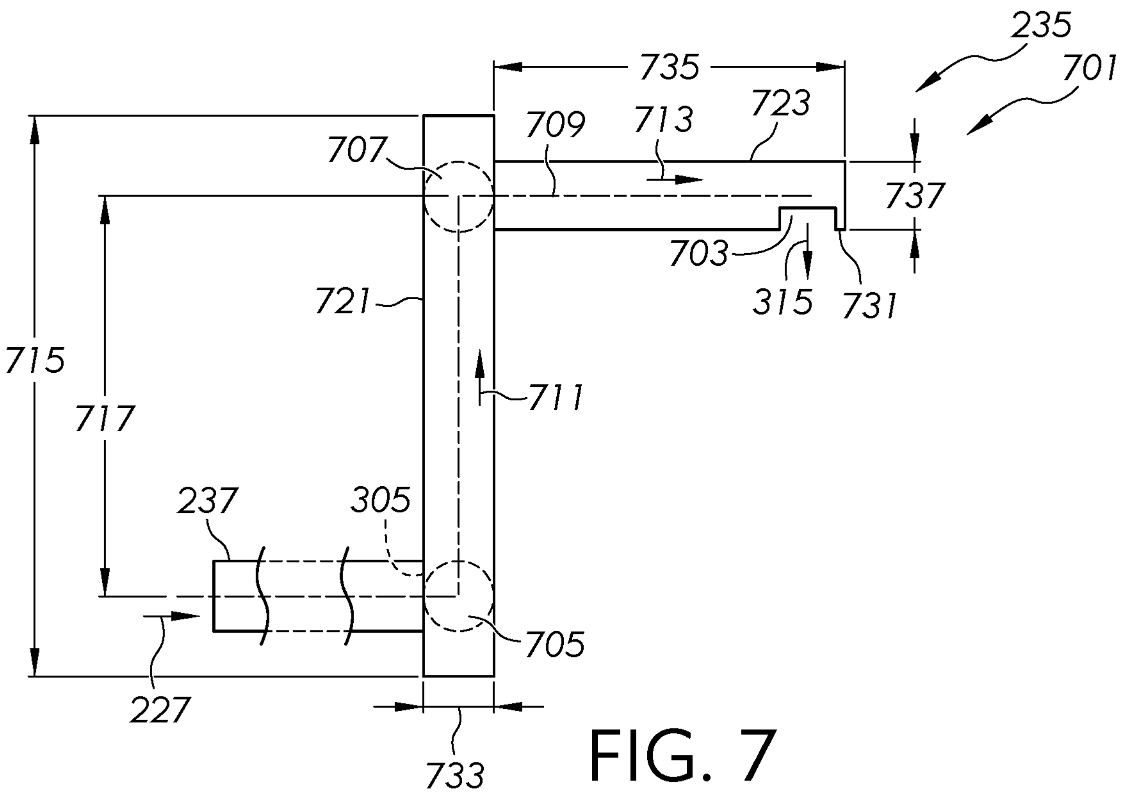
FIG. 7 illustrates a side view of a diffuser in accordance with some embodiments of the disclosure.
Figure 8:
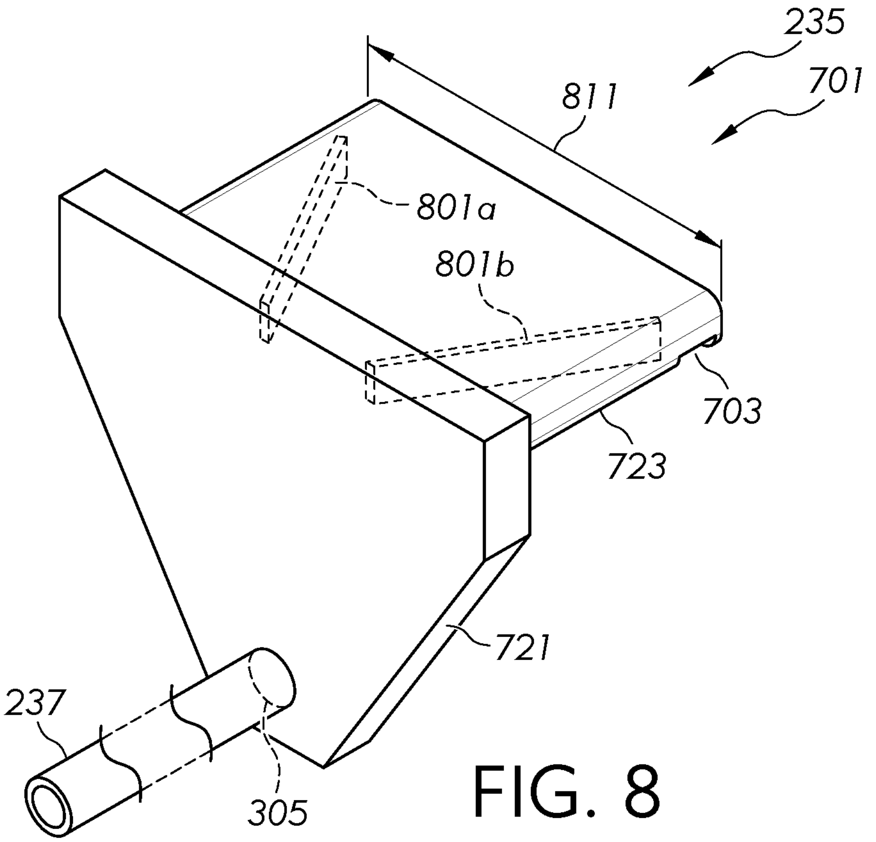
FIG. 8 illustrates a perspective view of the diffuser of FIG. 7 in accordance with some embodiments of the disclosure.
Figure 12:
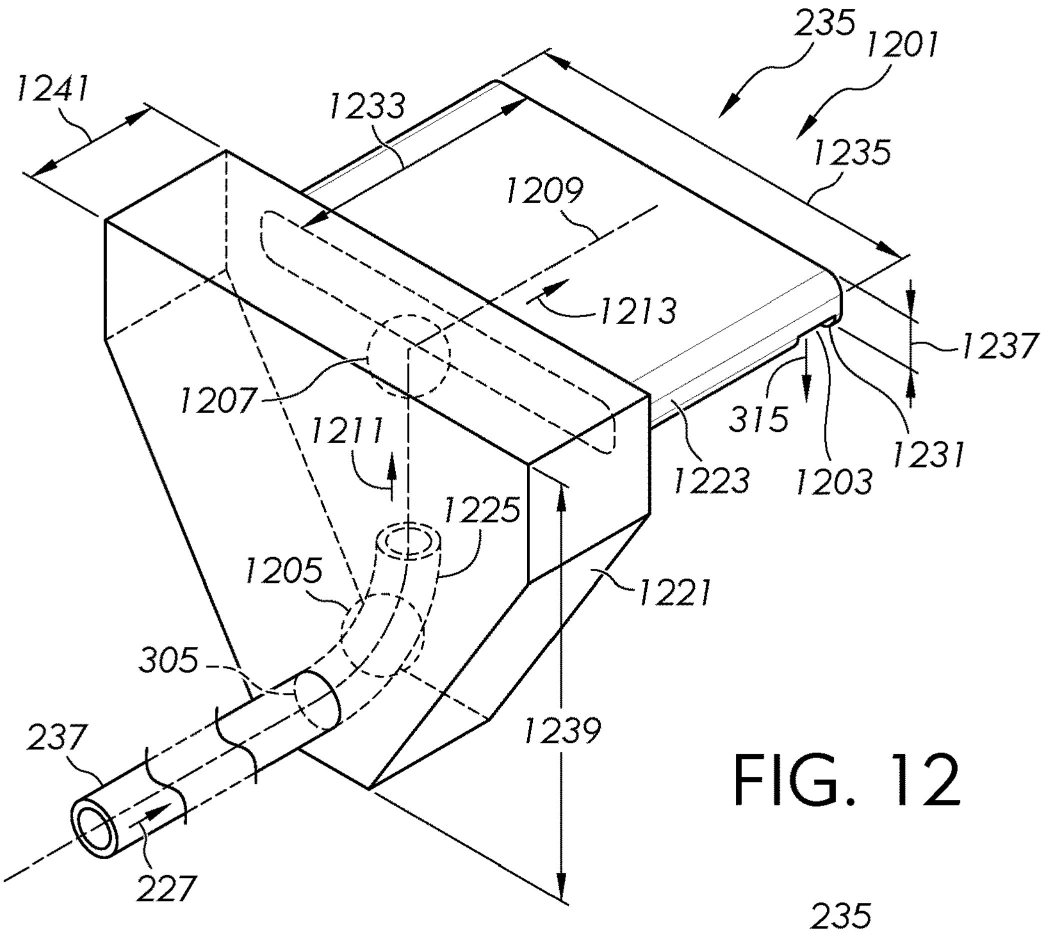
FIG. 12 illustrates a perspective view of a diffuser in accordance with some embodiments of the disclosure.
Figure 13:
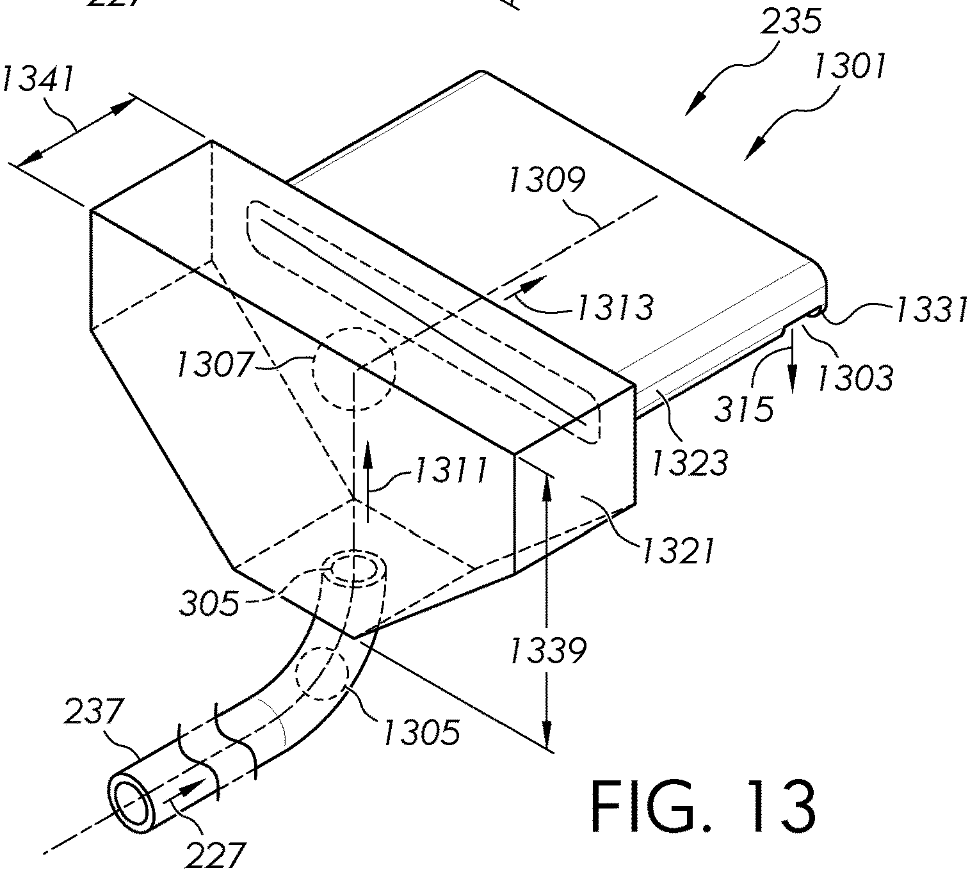
FIG. 13 illustrates a perspective view of a diffuser in accordance with some embodiments of the disclosure.

In some embodiments, as shown in FIGS. 7-8 and 12-13, the diffuser 701, 1201, or 1301 can comprise an expansion body 721, 1221, or 1321 connecting the inlet 305 to a main body 723, 1223, or 1323 of the diffuser 701, 1201, or 1301. Unlike in FIGS. 5-6, the expansion body 721, 1221, or 1321 in FIGS. 7-8 or 12-13 extends in a direction 711, 1211, or 1311 at an angle of about 90° from the direction 227 of the first gas passing through the inlet 305, although other angles are possible in further embodiments. However, like in FIGS. 5-6, the expansion body 721, 1221, or 1321, as shown in FIGS. 8 and 12-13, comprises a cross-sectional area perpendicular to the direction 711, 1211, or 1311 of the first gas passing through the expansion body 721, 1221, or 1321 that substantially continuously increases in the direction 711, 1211, or 1311 (e.g., towards the outlet 703, 1203, or 1303). Unlike in FIGS. 5-6, the expansion body 721, 1221, or 1321 in FIGS. 7-8 or 12-13 extends in the direction 711, 1211, or 1311 at an angle of about 90° from a direction 713, 1213, or 1313 of the first gas flowing through the main body 723, 1223, or 1323, although other angles are possible. Since the cross-sectional area of the main body 723, 1223, or 1323 is shown as substantially constant (see FIG. 8 or 12-13) and the cross-sectional area of the expansion body 721, 1221, or 1321 increases substantially continuously (see FIG. 8 or 12-13, as discussed above), a cross-sectional area of the diffuser 701, 1201, or 1301, as a whole, increases substantially continuously from the inlet 305 (e.g., inlet cross-sectional area) to the outlet 703, 1203, or 1303 (e.g., outlet cross-sectional area) along a direction of the first gas (e.g., direction 227, 711, and 713, direction 227, 1211, and 1213, or direction 227, 1311, and 1313). As shown in FIG. 8, the main body 723 can comprise guides 801*a* and 801*b*, such as the illustrated baffles, that can provide a substantially continuously expanding cross-sectional area accessible to the first gas in the main body 723. The main body (e.g., main body 323, 423, 523, 623, 1223, or 1323) of any of the embodiments of the disclosure discussed herein can optionally comprise guides similar to or identical to guides 801*a* and 801*b*. As shown in FIG. 12, the inlet conduit 237 can extend through the inlet 305 of the diffuser 1201 and an internal conduit 1225.

Figure 9:
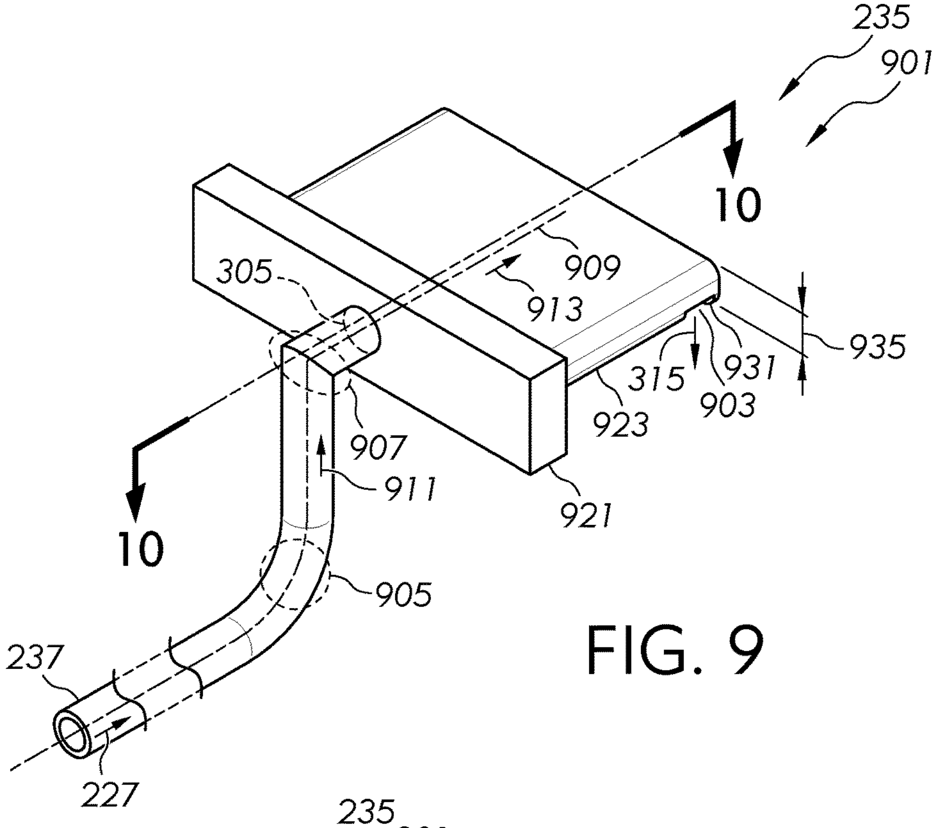
FIG. 9 illustrates a perspective view of a diffuser in accordance with some embodiments of the disclosure.
Figure 10:
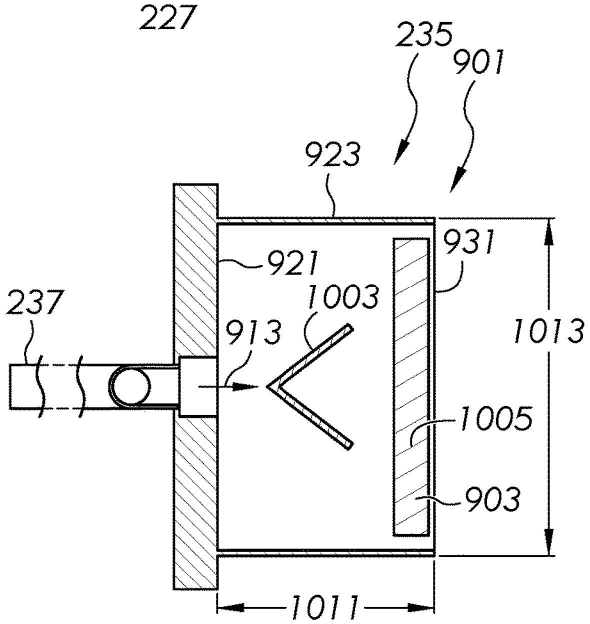
FIG. 10 illustrates a cross-sectional view of the diffuser taken along lines 10-10 of FIG. 9 in accordance with some embodiments of the disclosure.
Figure 11:
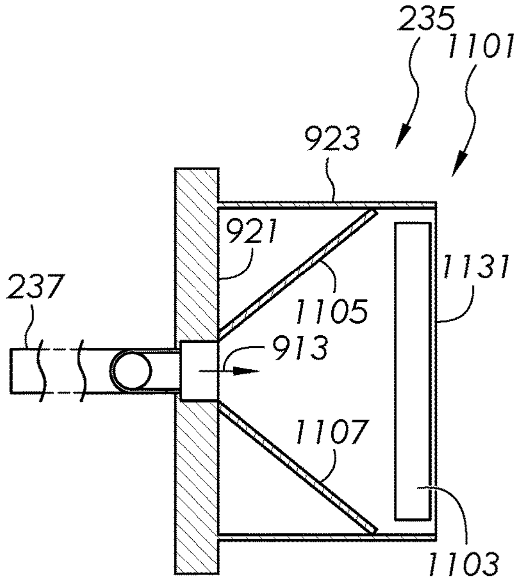
FIG. 11 illustrates a cross-sectional view of another diffuser taken along line 10-10 of FIG. 9 in accordance with some embodiments of the disclosure.

In some embodiments, as shown in FIGS. 9-11, the diffuser 901 or 1101 can comprise a main body 923. As shown, a cross-sectional area of the main body 923 perpendicular to a direction 913 of the first gas flowing through the main body 923 can be substantially constant. However, the diffuser 901 may not substantially continuously expand in a direction 913 of the first gas flowing therein since the cross-sectional area of the main body 923 does not increase. In further embodiments, as shown in FIG. 11, the diffuser 1101 can comprise a pair of guides 1105 and 1107 such as the illustrated baffles (e.g., similar to guides 801*a* and 801*b* in FIG. 8. The pair of guides 1105 and 1107 can be attached to a corresponding portion of a wall 921. Providing a pair of guides, such as the illustrated baffles, attached to the wall can provide a cross-sectional area of the main body accessible to the first gas that continuously expands in the direction of the first gas through the main body (e.g., towards the outlet), which can reduce an incidence of vortices and/or strong gas currents. In further embodiments, as shown in FIG. 10, the diffuser 901 can comprise a flow divider 1003, such as the illustrated baffle, positioned within the main body 923. The flow divider can be positioned along a centerline of the main body. It is to be understood than any of the embodiments of the disclosure can comprise a diffuser comprising a main body with a flow divider positioned therein. Providing a flow divider can promote the first gas flowing through the main body to expand to evenly flow through the outlet of the diffuser.

In some embodiments, the main body (e.g., main body 323, 423, 523, 623, 723, 923, 1223, or 1323) and/or expansion body (e.g., expansion body 521, 621, 721, 1221, or 1321) can comprise a cross-sectional area comprising a curvilinear shape (e.g., elliptical, circular), a polygonal shape (e.g., triangular, quadrilateral (e.g., rectangular, square), hexagonal, octagonal), or a combination thereof. The main body (e.g., main body 423 or 735) can comprise a length (e.g., length 417) in a direction (e.g., direction 227 or 713) of the first gas travelling through the main body (e.g., main body 423 or 723) of about 5 mm or more about 20 mm or more, about 40 mm or more, about 80 mm or more, about 100 mm or more, about 120 mm or more, about 2,000 mm or less, about 1,000 mm or less, about 400 mm or less, about 300 mm or less, about 200 mm or less, or about 150 mm or less. In further embodiments, the main body (e.g., main body 423 or 723) can comprise a length (e.g., length 417 or 735) in a direction (e.g., direction 227 or 713) of the first gas travelling through the main body (e.g., main body 423 or 723) in a range from about 5 mm to about 2,000 mm, from about 5 mm to about 1,000 mm, from about 20 mm to about 1,000 mm, from about 20 mm to about 400 mm, from about 40 mm to about 400 mm, from about 40 mm to about 200 mm, from about 80 mm to about 200 mm, from about 80 mm to about 150 mm, from about 100 mm to about 150 mm, from about 120 mm to about 150 mm, or any range or subrange therebetween. In further embodiments, the main body (e.g., main body 323, 423, 523, 623, 723, 923, 1223, or 1323) can comprise a width (e.g., width 311, 411, 511, or 611) and/or a length (e.g., length 417 or 735) in a direction perpendicular to a direction (e.g., direction 227, 713, 913, 1213, or 1313) of the first gas travelling through the main body of about 1 mm or more, about 5 mm or more, about 10 mm or more, about 20 mm or more, about 100 mm or less, about 60 mm or less, or about 40 mm or less. In further embodiments, the main body can comprise a width and/or a length in a direction perpendicular to a direction of the first gas travelling through the main body in a range from about 1 mm to about 100 mm, from about 5 mm to about 100 mm, from about 5 mm to about 60 mm, from about 10 mm to about 60 mm, from about 20 mm to about 60 mm, from about 20 mm to about 40 mm, or any range of subrange therebetween. The expansion body (e.g., expansion body 521, 621, 721, 1221, or 1321) can comprise a length (e.g., length 715) in a direction (e.g., direction 227, 711, 1211, or 1311) of the first gas flowing therein within one or more of the ranges discussed above for the length of the main body. In some embodiments, as shown in FIG. 2, as shown at least a portion of the first diffuser 235 can be positioned within the enclosure 220. In further embodiments, the first outlet of the first diffuser 235 can be positioned within the enclosure 220.

Throughout the disclosure, a gas path can be defined by the inlet conduit 237 and the first diffuser 235 as a path traveled by the gas through the corresponding structures, including through the outlet. In some embodiments, as shown in FIGS. 3-6, the gas path can be substantially linear through the inlet conduit 237 or 237*a-c* and the diffuser 301, 401, 501, or 601 until the gas reaches the outlet 303, 403, 503, or 603. In further embodiments, as shown, the end cap 331, 431, 531, and 631 and the outlet 303, 403, 503, or 603, can correspond to a change in direction of the first gas from within the main body (e.g., in the direction 227) to through the outlet 303, 403, 503, or 603 (e.g., direction 315). As used herein, a change in direction of the gas refers to an angle between an initial direction of the gas to a final direction of the gas along a portion of the gas path. As defined above for the direction of the gas flowing through the first outlet, a direction of the gas at a location refers to an average velocity-weighted orientation of the gas at the corresponding location along the gas path. In some embodiments, a change in direction of the first gas from within the main body (e.g., in the direction 227) to through the outlet 303, 403, 503, or 603 (e.g., direction 315) can be about 45° or more, about 60° or more, about 75° or more, about 85° or more, about 90°, about 135° or less, about 120° or less, about 105° or less, or about 95° or less. In some embodiments, a change in direction of the first gas from within the main body (e.g., in the direction 227) to through the outlet 303, 403, 503, or 603 (e.g., direction 315) can be in a range from about 45° to about 135°, from about 60° to about 120°, from about 75° to about 105°, from about 85° to about 95°, or any range or subrange therebetween.

In some embodiments, as shown in FIGS. 7, 9, and 12-13, the gas path 709, 909 1209, and/or 1309 can comprise at least one change in direction, for example, a change in direction of about 90° or more (e.g., about 90°). For example, the gas path may comprise a change from a direction 713, 913, 1213, or 1313 of the first gas within the main body 723, 923, 1223, or 1313 to the direction 315 through the first outlet 703, 903, 1203, or 1303. In further embodiments, as shown, the gas path 709, 909, 1209, and/or 1309 can comprise at least two changes in direction. In further embodiments, the gas path 709, 909, 1209, and/or 1309 can comprise at least two changes in direction of about 90° or more (e.g., about 90°), for example, (i) from a direction 713, 913, 1213, or 1313 of the first gas within the main body 723, 923, 1223, or 1313 to the direction 315 through the first outlet 703, 903, 1203, or 1303 and (ii) at or around a location 707, 907, 1207, or 1307 from a direction 711, 1211, or 1311 within the expansion body 721, 1221, or 1321 or a direction 911 within the inlet conduit 237 to a direction 713, 1213, or 1313 within the main body 723, 1223, or 1323 of the diffuser 701, 1201, or 1301. As shown in FIGS. 7 and 12-13, a change in direction of the at least two changes in direction can be positioned with the diffuser 701, 1201, or 1301 as described above as change in direction (ii). In still further embodiments, the gas path 709, 909, 1209, and/or 1309 can comprise at least three changes in direction. In some embodiments, the gas path 709, 909, 1209, and/or 1309 can comprise at least three changes in direction of about 90° or more (e.g., about 90°), for example, (i) from a direction 713, 913, 1213, or 1313 of the first gas within the main body 723, 923, 1223, or 1313 to the direction 315 of the first gas through the first outlet 703, 903, 1203, or 1303, (ii) at or around a location 707, 907, 1207, or 1307 from a direction 711, 1211, or 1311 within the expansion body 721, 1221, or 1321 or a direction 911 within the inlet conduit 237 to a direction 713, 1213, or 1313 within the main body 723, 1223, or 1323 of the diffuser 701, 1201, or 1301, and (iii) at or around a location 705, 905, 1205, or 1305 from a direction 227 of the first gas within the inlet conduit 237 to a direction from a direction 711, 1211, or 1311 within the expansion body 721, 1221, or 1321 or a direction 911 within the inlet conduit 237. Providing a change of direction of about 90° or more of the gas path can reduce a likelihood that gas currents from the first gas flowing through the outlet of the diffuser will impair a quality of the glass-forming ribbon. As shown in FIG. 7, a displacement 717 of the gas path 709 from the inlet conduit 237 to the outlet 703 can be within one or more of the ranges discussed above for the length of the expansion body. Providing at least two changes in direction of about 90° or more can enable a displacement of the diffuser (e.g., in the direction of the travel direction 154) that can facilitate efficient use of a limited space within the enclosure, for example comprising a first diffuser and a plurality of cooling tubes, and/or reduce a likelihood that gas currents from the gas flowing through the outlet of the diffuser will impair a quality of the glass-forming ribbon.

In some embodiments, as shown in FIG. 2, the glass manufacturing apparatus 100 can comprise a first housing 230 comprising a first wall 233 positioned within the enclosure 220. As shown, the first housing 230 can further bound the enclosure area 221, for example, along dashed line 236 extending from the top of the first wall 233, the first wall 233, and dashed line 226 extending from the bottom of the first wall 233. In further embodiments, the first housing 230 can enclose and/or bound a first interior area 231, for example, as an area within the first wall 233 (e.g., the region bounded by the first wall 233 and dashed line 226). The first diffuser 235 can be positioned within the first interior area 231. In some embodiments, the first outlet of the first diffuser 235 and/or at least a portion of the first inlet conduit 237 can be positioned within the first interior area 231. In As shown by arrow 222, the first interior area 231 can be in fluid communication with the enclosure area 221. The first housing 230 can be configured to translate in direction 232*a* and/or 234*a* to decrease and/or increase a distance of the first housing 230 from the travel plane 213 (e.g., glass-forming ribbon 103).

In some embodiments, as shown in FIG. 2, the flow apparatus 175 (e.g., first flow apparatus 238) can optionally comprise a plurality of cooling tubes 255. The plurality of cooling tubes 255 can be positioned within the first housing 230 (e.g., in the first interior area 231). A cooling tube of the plurality of cooling tubes 255 can be configured to emit a cooling fluid through a corresponding outlet 257 in a direction 256 towards the travel plane 213 (e.g., glass-forming ribbon 103). The cooling fluid can comprise a temperature less than an operating temperature of the enclosure area 221. In some embodiments, the plurality of cooling tubes 255 can be configured to cool a location of the first wall 233 of the first housing 230 by being configured to flow the cooling fluid within the first interior area 231. As shown, a cooling source 259 can be configured to provide the cooling fluid to the plurality of cooling tubes 255. The cooling source 259 can comprise one or more of the gases discussed above with regards to the first gas source 239. The second diffuser 245 can be positioned downstream of the plurality of cooling tubes 255 along the travel direction 154, although the second diffuser can be positioned upstream or at the same location as the plurality of cooling tubes along the travel direction in further embodiments.

In some embodiments, the diffuser 235 of the flow apparatus 175 (e.g., the first flow apparatus 238) can comprise a plurality of first diffusers although a single diffuser may be provided in further embodiments. The number of the plurality of first diffusers can be 2 or more, 4 or more, 8 or more, 16 or more, 128 or less, 80 or less, 60 or less, or about 32 or less, for example, in a range from about 2 to about 128, from about 4 to about 128, from about 4 to about 80, from about 4 to about 60, from about 8 to about 60, from about 8 to about 32, from about 16 to about 32, or any range or subrange therebetween. Each diffuser of the plurality of first diffusers can be connected to a respective first gas source (e.g., first gas source 239), for example by a respective inlet conduit (e.g., first inlet conduit 237). In some embodiments, one or more diffusers of the plurality of first diffusers may be connected to the same first gas source. The plurality of first diffusers can be arranged in a first row (e.g., in a direction perpendicular to the direction of the travel direction 154, extending along a direction of width "W" of the glass-forming ribbon 103, the direction in/out of the page of FIG. 2).

In some embodiments, as shown in FIG. 2, the flow apparatus 175 can comprise the second flow apparatus 248 comprising a second diffuser 245. The second diffuser 245 can comprise one or more of the diffusers discussed above or a variation thereof. For example, the second diffuser 245 can comprise one or more of the materials discussed above for the first diffuser 235. The second diffuser 245 can comprise a main body comprising a length, a width, and/or a thickness within one or more of the ranges discussed above for the corresponding dimension of the first diffuser 235. The second diffuser 245 can comprise a second outlet comprising a second outlet cross-sectional area and a second inlet comprising a second inlet cross-sectional area, and the second outlet cross-sectional area can be greater than the second inlet cross-sectional area. In still further embodiments, the second diffuser 245 can comprise an area ratio of the second outlet cross-sectional area to the second inlet cross-sectional area within one or more of the ranges discussed above for the area ratio of the first diffuser 235. In some embodiments, a cross-sectional area of the second diffuser can substantially continuously increase (e.g., continuously increase) from the second inlet cross-sectional area to the second outlet cross-sectional area (e.g., along the gas path). In further embodiments, an angle between the travel plane 213 (e.g., first major surface 213*a* of the glass-forming ribbon) and a direction normal to the first outlet cross-sectional area can be within one or more of the ranges discussed above for the corresponding angle of the first diffuser 235. The second diffuser 245 can be connected to a second inlet conduit 247. The second inlet conduit 247 can comprise one or more of the materials discussed above for the first inlet conduit 237. The second conduit can comprise a maximum internal dimension, minimum internal dimension, and/or an internal cross-sectional area within one or more of the corresponding ranges of the first inlet conduit 237. In some embodiments, a second gas path can be defined by the second inlet conduit 247 and the second diffuser 245. The second gas path can be substantially linear or comprise at least one change in direction. For example, the second gas path can comprise at least one change in direction of about 90° or more, at least two changes in direction of about 90° or more, or at least three changes in direction of about 90° or more, as discussed above for the gas path. In further embodiments, the second diffuser 245 can be in fluid communication with (e.g., connected to) a second gas source 249 supplying a second gas. The second gas source 249 can comprise one or more of the structures discussed above for the first gas source 239. The second gas can comprise one or more of the materials of the first gas.

As shown in FIG. 2, the glass manufacturing apparatus 100 (e.g., flow apparatus 175, second flow apparatus 248) can comprise a second housing 240 comprising a second wall 243 positioned within the enclosure 220. As shown, the second housing 240 can further bound the enclosure area 221, for example, along dashed line 246 extending from the top of the second wall 243, the second wall 243, and dashed line 246 extending from the bottom of the second wall 243. In some embodiments, the second housing 240 can enclose and/or bound second interior area 241, for example, as an area within the second wall 243 (e.g., region bounded by the second wall 243 and dashed line 246). As shown, the second diffuser 245 can be positioned within the second interior area 241. The second outlet of the second diffuser 245 and/or at least a portion of the second inlet conduit 247 can be positioned within the second interior area 241. As shown by arrow 224, the second interior area 241 can be in fluid communication with the enclosure area 221. In further embodiments, the second housing 240 can be configured to translate in direction **232*b* and/or 234*b* to decrease and/or increase a distance of the second housing 240 from the travel plane 213 (e.g., glass-forming ribbon 103). The travel plane 213 can pass between the first housing 230 and the second housing 240**.

Referring to FIG. 2, the flow apparatus 175 (e.g., first flow apparatus 238) can optionally comprise a plurality of second cooling tubes 265. As shown, the plurality of second cooling tubes 265 can be positioned within the second housing 240 (e.g., in the second interior area 241). One or more cooling tube of the plurality of second cooling tubes 265 can be configured to emit a second cooling fluid through a corresponding outlet 267 in a direction 266 towards the travel plane 213 (e.g., glass-forming ribbon 103). The second cooling fluid can comprise a temperature less than an operating temperature of the enclosure area 221. The plurality of second cooling tubes 265 can be configured to cool a location of the second wall 243 of the second housing 240 by flowing the second cooling fluid within the second interior area 241. As shown, a second cooling source 269 can be configured to provide the second cooling fluid to (e.g., through) the plurality of second cooling tubes 265. The second cooling source 269 can comprise one or more of the gases discussed above with regards to the first gas source 239. In some embodiments, the second diffuser 245 can be positioned downstream of the plurality of second cooling tubes 265 along the travel direction 154, although the second diffuser can be positioned upstream or at the same location as the plurality of cooling tubes along the travel direction in further embodiments.

In some embodiments, the second diffuser 245 of the flow apparatus 175 (e.g., the second flow apparatus 248) can comprise a plurality of second diffusers although a single diffuser may be provided in further embodiments. The number of the plurality of second diffusers can be within one or more of the ranges discussed above for the number of the plurality of first diffusers. In further embodiments, each diffuser of the plurality of second diffusers can be connected to a respective second gas source (e.g., second gas source 249), for example by a respective inlet conduit (e.g., second inlet conduit 247). One or more diffusers of the plurality of second diffusers may be connected to the same second gas source. In some embodiments, the plurality of second diffusers can be arranged in a second row (e.g., in a direction perpendicular to the direction of the travel direction 154, extending along a direction of width "W" of the glass-forming ribbon 103, the direction in/out of the page of FIG. 2).

The glass manufacturing apparatus 100 of the embodiments of the disclosure can be used in methods of manufacturing glass. Methods can comprise flowing a glass-forming ribbon 103 along a travel direction 154, as shown in FIG. 2. In some embodiments, at least a portion of the glass-forming ribbon 103 can be within the enclosure area 221 bounded by the enclosure 220. In some embodiments, methods can comprise flowing a first gas through a first inlet conduit 237 and through the first inlet 305 of the first diffuser 235 into the first diffuser 235. The first gas flowing through the first inlet 305 of the first diffuser 235 comprises a first average inlet velocity. The first average inlet velocity can be about 0.5 meters per second (m/s) or more, about 1 m/s or more, about 2 m/s or more, about 3 m/s or more, about 50 m/s or less, about 25 m/s or less, about 10 m/s or less, about 8 m/s or less, or about 5 m/s or less. In some embodiments, the first average inlet velocity can be in a range from about 0.1 m/s to about 50 m/s, from about 0.5 m/s to about 50 m/s, from about 0.5 m/s to about 25 m/s, from about 1 m/s to about 25 m/s, from about 1 m/s to about 10 m/s, from about 2 m/s to about 10 m/s, from about 2 m/s to about 8 m/s, from about 3 m/s to about 8 m/s, from about 3 m/s to about 5 m/s, or any range or subrange therebetween.

Methods may also comprise flowing the first gas from the first diffuser 235 through the first outlet (e.g., outlet 303, 403, 503, 603, 703, 903, 1103, 1203, or 1303) of the first diffuser 235. The first gas flowing through the first outlet comprises a first average outlet velocity. In some embodiments, the first average inlet velocity can be greater than the first average outlet velocity. The first average outlet velocity can be about 0.01 m/s or more, about 0.05 m/s or more, about 0.1 m/s or more, about 0.2 m/s or more, about 0.3 m/s or more, about 0.4 m/s or more, about 2 m/s or less, about 1.8 m/s or less, about 1.5 m/s or less, or about 1 m/s or less, about 0.8 m/s or less, or about 0.6 m/s or less. In some embodiments, the first average outlet velocity can be in a range from about 0.01 m/s to about 2 m/s, from about 0.01 m/s to about 1.7 m/s, from about 0.05 m/s to about 1.7 m/s, from about 0.05 m/s to about 1.5 m/s, from about 0.1 m/s to about 1.5 m/s, from about 0.1 m/s to about 1 m/s, from about 0.2 m/s to about 1 m/s, from about 0.2 m/s to about 0.8 m/s, from about 0.3 m/s to about 0.8 m/s, from about 0.3 m/s to about 0.6 m/s, from about 0.4 m/s to about 0.6 m/s, or any range or subrange therebetween. The first gas flowing through the first outlet comprises a first maximum outlet velocity of about 0.5 m/s or more, about 1 m/s or more, about 2 m/s or more, about 3 m/s or more, about 10 m/s or less, about 8 m/s or less, about 5 m/s or less, or about 4 m/s or less. In some embodiments, the first maximum outlet velocity can be in a range from about 0.5 m/s to about 10 m/s, from about 0.5 m/s to about 8 m/s, from about 1 m/s to about 8 m/s, from about 1 m/s to about 5 m/s, from about 2 m/s to about 5 m/s, from about 2 m/s to about 4 m/s, from about 3 m/s to about 4 m/s, or any range or subrange therebetween. Providing a diffuser in accordance with embodiments of the disclosure can decrease the maximum velocity (e.g., maximum outlet velocity) of gas flowing through the first outlet cross-sectional area, which can reduce an intensity of currents of the first gas that could interfere with the quality of the glass ribbon.

Flowing the first gas through the first inlet conduit 237 and flowing the first gas through the first diffuser 235 can comprise flowing the first gas along a gas path defined by an inlet conduit 237 and the first diffuser 235. In some embodiments, as discussed above with reference to FIGS. 7-13, the first gas flowing along the gas path and/or the gas path can comprise at least one change in direction within one or more the ranges discussed above for the gas path, for example, at least one change in direction of about 90° or more, at least two changes in direction of about 90° or more, or at least three changes in direction of about 90° or more. The first gas may undergo a pressure drop along the gas path from the beginning of the gas path to the end of the gas path at the outlet of the diffuser. As used herein, a pressure of the gas can be measured using a barometer, for example, a manometer, an aneroid gauge (e.g., Bourdon gauge, diaphragm, bellows, magnetic coupling gauge), and/or a piezoresistive pressure sensor. The pressure drop incurred along the gas path comprising at least two changes in direction of about 90° or more (e.g., about 90°) can be about 0.1 Pascals (Pa) or more, about 1 Pa or more, about 10 Pa or more, about 20 Pa or more, about 30 Pa or more, about 40 Pa or more, about 200 Pa or less, about 150 Pa or less, about 100 Pa or less, about 80 Pa or less, about 60 Pa or less, or about 50 Pa or less. In some embodiments, a pressure drop incurred along the gas path comprising at least two changes in direction of about 90° or more can be in a range from about 0.1 Pa to about 200 Pa, from about 0.1 Pa to about 150 Pa, from about 1 Pa to about 150 Pa, from about 1 Pa to about 100 Pa, from about 10 Pa to about 100 Pa, from about 10 Pa to about 80 Pa, from about 20 Pa to about 80 Pa, from about 20 Pa to about 60 Pa, from about 30 Pa to about 60 Pa, from about 30 Pa to about 50 Pa, from about 40 Pa to about 50 Pa, or any range or subrange therebetween. Providing the first diffuser can enable a low pressure drop (e.g., from about 100 Pascals or less) along a gas path through a first inlet and the first diffuser with at least two changes in direction of about 90° or more, which can increase an efficiency of the diffuser.

In some embodiments, the first gas flowing through the outlet (e.g., outlet 303, 403, 503, 603, 703, 903, 1103, 1203, or 1303) of the first diffuser 235 can flow within the enclosure 220. As shown in FIG. 2, at least a portion of the first diffuser 235 (e.g., entire first diffuser and/or the outlet of the first diffuser) can be positioned within the enclosure 220. For example, the first diffuser 235 can be positioned in the enclosure area 221, where the first gas flowing through the outlet of the first diffuser 235 directly flows into the enclosure area 221. The first diffuser 235 can be positioned in the first interior area 231 bounded within the first wall 233 of the first housing 230. For example, the first gas flowing through the outlet of the first diffuser 235 can flow into the enclosure area 221 by flowing into the first interior area 231 and then flowing into the enclosure area 221 since the first interior area 231 can be in fluid communication with the enclosure area 221. Flowing the first gas through the first outlet can increase an enclosure pressure of the enclosure area. Increasing the enclosure pressure can reduce a flow 228 of air in a direction of opposite the travel direction 154 of the glass-forming ribbon 103 (e.g., into the enclosure area). Increasing the enclosure pressure can reduce an incidence of hydrogen blistering of the glass ribbon. Increasing the enclosure pressure can reduce a flow of air in a direction opposite a travel direction of the glass ribbon, for example, hot air rising in down-draw forming devices in a so-called "stack" or "chimney" effect. Additionally, increasing the enclosure pressure can compensate for any leaks in the enclosure that could disrupt the quality of the resulting glass ribbon. Reducing the flow of air in a direction opposite a travel direction of the glass ribbon can reduce particles and other debris carried by such flows towards the glass ribbon.

In some embodiments, the first diffuser 235 can comprise a plurality of first diffusers. For example, the plurality of first diffusers can be arranged in a first row (e.g., in a direction perpendicular to the direction of the travel direction 154, extending along a direction of width "W" of the glass-forming ribbon 103, the direction in/out of the page of FIG. 2). Throughout the disclosure, a flow rate measured in standard cubic meters refers to the flow rate measured at 20° C. and 101.325 kiloPascals absolute pressure (e.g., 1 atmosphere).

A total flow rate of the first gas flowing through the first outlets of the plurality of first diffusers can be about 1 standard cubic meters per hour ($sm^3/h$ or smch) or more, about 4 smch or more, about 6 smch or more, about 12 smch or more, about 500 smch or less, about 200 smch or less, about 100 smch or less, about 80 smch or less, about 60 smch or less, about 30 smch or less, or about 20 smch or less. In some embodiments, a total flow rate of the first gas flowing through the first outlets of the plurality of first diffusers can be in a range from about 1 smch to about 500 smch, from about 1 smch to about 200 smch, from about 4 smch to about 200 smch, from about 4 smch to about 100 smch, from about 4 smch to about 80 smch, from about 6 smch to about 80 smch, from about 6 smch to about 60 smch, from about 6 smch to about 30 smch, from about 12 scmh to about 30 smch, from about 12 smch to about 20 smch, or any range or subrange therebetween.

In some embodiments, methods can comprise flow a second gas (e.g., from a second gas source 249) through a second inlet conduit 247 and through the second inlet (e.g., inlet 305) of the second diffuser 245 into the second diffuser 245. The first gas flowing through the second inlet (e.g., inlet 305) of the second diffuser 245 can comprise a second average inlet velocity, which can be within one or more of the ranges discussed above for the first average inlet velocity. In some embodiments, the first average inlet velocity can be substantially the same, greater than, or less than the second average inlet velocity. Methods can comprise flowing the second gas from the second diffuser 245 through the second outlet (e.g., outlet 303, 403, 503, 603, 703, 903, 1103, 1203, or 1303) of the second diffuser 245. The second gas flowing through the second outlet can comprise a second average outlet velocity, which can be within one or more of the ranges discussed above for the first average outlet velocity. In some embodiments, the second inlet average velocity can be greater than the second average outlet velocity. In some embodiments, the first average outlet velocity can be substantially the same, greater than, or less than the second average outlet velocity. In further embodiments, the second gas flowing through the second outlet can comprise a second maximum outlet velocity, which can be within one or more of the ranges discussed above for the first maximum outlet velocity. Similarly, the first maximum outlet velocity can be substantially the same, greater than, or less than the second maximum outlet velocity. In some embodiments, the second diffuser 245 can comprise a plurality of second diffusers. The plurality of second diffusers can be arranged in a second row (e.g., in a direction perpendicular to the direction of the travel direction 154, extending along a direction of width "W" of the glass-forming ribbon 103, the direction in/out of the page of FIG. 2). A total flow rate of the second gas flowing through the second outlets of the plurality of second diffusers can be within one or more of the ranges discussed above of the total flow rate of the first gas.

Flowing the second gas through the second inlet conduit 247 and the flowing the first gas through the second diffuser 245 comprises flowing the first gas along a second gas path through a second inlet conduit 247 and the second diffuser 245 in a second flow direction 251. As discussed above, the second gas flowing along the second gas path and/or the second gas path can comprise at least one change in direction within one or more the ranges discussed above for the gas path, for example, at least one change in direction of about 90° or more, at least two changes in direction of about 90° or more, or at least three changes in direction of about 90° or more. The second gas may undergo a pressure drop the second gas path from the beginning of the second gas path to the end of the second gas path at the outlet of the second diffuser, for example, within one or more of the range discussed above for the pressure drop along the first gas path. Providing the first diffuser can enable a low pressure drop (e.g., about 100 Pascals or less) along a gas path through a first inlet and the first diffuser with at least two changes in direction of about 90° or more, which can increase an efficiency of the diffuser.

In some embodiments, the second gas flowing through the outlet (e.g., outlet 303, 403, 503, 603, 703, 903, 1103, 1203, or 1303) of the second diffuser 245 can flow within the enclosure 220. As shown in FIG. 2, at least a portion of the second diffuser 245 (e.g., entire second diffuser and/or the outlet of the second diffuser) can be positioned within the enclosure 220. For example, the second diffuser 245 can be positioned in the enclosure area 221, where the second gas flowing through the second outlet of the second diffuser 245 directly flows into the enclosure area 221. The second diffuser 245 can be positioned in the second interior area 241 within the second wall 243 of the second housing 240. The second gas flowing through the second outlet of the second diffuser 245 can flow into the enclosure area 221 by flowing into the second interior area 241 and then flowing into the enclosure area 221 since the second interior area 241 can be in fluid communication with the enclosure area 221. Flowing the second gas through the second outlet can increase an enclosure pressure in the enclosure area 221. Increasing the enclosure pressure can provide the technical benefits discussed above with respect to increasing the enclosure pressure by flowing the first gas.

In some embodiments, methods can optionally comprise flowing a cooling fluid through a plurality of cooling tubes 255 to flow within the first interior area 231, which can cool at least a portion of the first wall 233 of the first housing 230. Methods can optionally comprise flowing a second cooling fluid through a plurality of second cooling tubes 265 to flow within the second interior area 241, which can cool at least a portion of the second wall 243 of the second housing 240. Methods can comprise passing (e.g., flowing) the glass-forming ribbon 103 between the first housing 230 and the second housing 240.

EXAMPLES

Various embodiments will be further clarified by the following examples. Table 1 presents characteristics of Examples A-F measured at a flow rate of 510 scmh per diffuser while Table 2 presents characteristics of Examples G-K measured at a flow rate of 340 scmh. Examples A-K comprised an inlet conduit comprising SAE grade 316 stainless steel with an inner diameter of about 16 mm.

Example A corresponds to the diffuser 701 shown in FIGS. 7-8 without the guides 801*a* and 801*b* but with a length 715 of the expansion body 721 of 114 mm, a displacement 717 of the gas path 709 of 86 mm, a width 733 of the expansion body 721 of 14 mm, a length 735 of the main body 723 of 109 mm, a width 811 of the main body 723 of 152 mm, and a thickness 737 of the main body 723 of 19 mm. Example B corresponds to the diffuser 901 shown in FIGS. 9-10 without the flow divider 1003, but with a length 1011 of the main body 923 of 106 mm, a width 1013 of the main body 923 of 152 mm, and a thickness 935 of the main body 923 of 19 mm. Example C corresponds to the diffuser 901 shown in FIGS. 9-10 with the same dimensions as Example B but with the flow divider 1003 centered within the main body 923, extending for the thickness 935 of the main body 923, and extending from the vertex for 19 mm at a 45° relative to the direction 913. Example D corresponds to the diffuser 1101 shown in FIG. 11 with the same dimensions as Example B but with the pair of guides 1105 and 1107 extending from the wall 921, respectively at an angle of 38° relative to the direction 913. Example E corresponds to the diffuser shown in FIG. 12 with the inlet conduit 237 extending into the expansion body 1221 as a right angle bend with an internal radius of 38 mm, a length 1239 of the expansion body 1221 of 115 mm, a thickness 1241 of the expansion body 1221 of 67 mm, a length 1233 of the main body 1223 of 86 mm, a width 1235 of the main body 1223 of 152 mm, and a thickness 1237 of the main body 1223 of 19 mm. Example F comprises the same dimension of the main body 1331 as the main body 1223 of Example E, but Example F comprises the 38 mm internal radius right angle bend before the inlet 305, a height 1339 of the expansion body 1321 of 61 mm and a width 1341 of the expansion body 1321 of 32 mm.

Examples A-F all comprise the same average outlet velocity of 0.45 m/s. However, Examples B and D comprise the greatest maximum outlet velocity of 15.7 m/s of Examples A-F. Since the maximum outlet velocity is the same for Example B (no guides 1105 and 1107 or flow divider 1003) and Example D (including guides 1105 and 1107), the guides do not help reduce the maximum outlet velocity for this diffuser design. However, the flow divider 1003 of Example C reduces the maximum outlet velocity compared to Examples B and D. Examples A and E-F comprise a maximum outlet velocity of 10 m/s or less, 5 m/s or less, and 4 m/s or less. Examples A and E-F comprise an expansion body between the inlet conduit and the main body of the diffuser as well as a right angle bend in the inlet conduit, which together provide a reduced maximum outlet velocity compared to Examples B-D that do not comprise the expansion body. Also, Examples A and E-F comprise a pressure drop of less than 100 Pa, less than 80 Pa, and less than 70 Pa. Example E (right angle bend inside of the expansion body—after the inlet) comprises a lower pressure drop than Example F (right angle bend upstream of the inlet). Examples B-D comprise a pressure drop greater than 200 Pa but did not comprise an expansion body while Examples A and E-F comprise a pressure drop less than 100 Pa and do comprise an expansion body. Consequently, providing an expansion body can reduce the pressure drop.

TABLE 1

| Characteristics of Examples A-F at 510 scmh | | | | |
|---|---|---|---|---|
| Example | Average Outlet Velocity (m/s) | Maximum Outlet Velocity (m/s) | Pressure Drop (Pa) | Area Ratio |
| A | 0.45 | 1.93 | 24 | 24.8 |
| B | 0.45 | 15.7 | 284 | 24.8 |
| C | 0.45 | 10.6 | 275 | 24.8 |
| D | 0.45 | 15.7 | 283 | 24.8 |
| E | 0.45 | 2.78 | 50 | 24.8 |
| F | 0.45 | 3.25 | 64 | 24.8 |

TABLE 2

| Characteristics of Examples G-K at 340 scmh | | | | | |
|---|---|---|---|---|---|
| Example | Length (mm) | Average Outlet Velocity (m/s) | Maximum Outlet Velocity (m/s) | Pressure Drop | Area Ratio |
| G | 165 | 1.73 | 5.70 | 98 | 13 |
| H | 145 | 1.73 | 12.02 | 50 | 13 |
| I | 195 | 1.73 | 8.69 | 30 | 13 |
| J | 245 | 1.73 | 6.90 | 22 | 13 |
| K | 300 | 1.73 | 6.20 | 20 | 13 |

Examples H-K correspond to the diffuser 401 shown in FIG. 4 with 1 inlet conduit rather than 3, width 411 of the main body 423 of 41 mm, a thickness 415 of the main body 423 of 16 mm, and the length 417 of the main body 423 as presented in Table 2. Example G is the same as Example H except for the length (as specified in Table 2) and that a gas path of Example G comprises a change of direction of 45° in the inlet conduit.

Examples A-F all comprise an area ratio of 24.8 with the inlet conduit comprising an internal radius of 16 mm. Examples A-F all comprise the same average outlet velocity of 0.45 m/s. Examples G-K all comprise an area ratio of 13 with the inlet conduit comprising an internal radius of 9 mm. Examples G-K all comprise the same average outlet velocity of 1.73 m/s. The increased area ratio (24.8>13) of examples A-F correspond to a lower average outlet velocity (0.45 m/s<1.73 m/s) than Examples G-K. Indeed, the percentage decrease in the average outlet velocity is greater than the percentage decrease in flow rate, greater than the percentage decrease in inlet cross-sectional area, and greater than the percentage decrease in flow rate per inlet cross-sectional area.

For Examples H-K, the maximum outlet velocity decreases as the length of the main body increases, going from 12.02 m/s for a length of 145 mm to 6.20 m/s for a length of 300 mm. The decrease in velocity per increase in length is the greatest between Examples H and I, which indicates that there are diminishing returns from additional increases in the length. For Examples H-K, the pressure drop also decreases as the length of the main body increases, going from 50 Pa for Example H to 20 Pa for Example K. The decrease in pressure drop per increase in length is the greatest between examples H and I, which indicates that there are diminishing returns from additional increases to the length. Examples G-K comprise a pressure drop of about 100 Pa or less. Examples H-K further comprise a pressure drop of about 80 Pa or less, about 60 Pa or less, or about 50 Pa or less. Comparing Example G (45° change in direction in inlet conduit) to Example H (no change in direction in inlet conduit), the maximum outlet velocity is lower for Example G but the pressure drop is lower for Example H. This indicates that the change in direction decreased the maximum outlet velocity while increasing the pressure drop, which could be result of the gas losing pressure and velocity as a result of the change in direction. However, the maximum outlet velocity can be reduced by providing and/or increasing a change in direction as long as the increase in pressure drop is tolerable. Comparing Example G to Examples E-F, it appears that adding the expansion chamber decreased the pressure drop, for example, by allowing the gas space to reorient with losing as much pressure even though Examples E-F comprise an additional change in direction compared to Example G and Examples E-F are measured at a higher flow rate, where pressure drops would be greater.

Embodiments of the disclosure can provide methods of manufacturing glass that can produce glass ribbons with one or more high-quality, pristine surfaces. Flowing gas through the first diffuser can increase an enclosure pressure around a forming device and at least a portion of the glass-forming ribbon (e.g., travel path). Increasing the enclosure pressure can reduce an incidence of hydrogen blistering of the glass ribbon. Increasing pressure can reduce a flow of air in a direction opposite a travel direction of the glass ribbon, for example, hot air rising in down-draw forming devices in a so-called “stack” or “chimney” effect. Additionally, increasing the enclosure pressure can compensate for any leaks in the enclosure that could disrupt the quality of the glass ribbon. Reducing the flow of air in a direction opposite a travel direction of the glass ribbon can reduce particles and other debris carried by such flows towards the glass ribbon. Providing the first diffuser within the housing can reduce particles and other debris within the housing, for example, when the glass-forming ribbon is in a viscous or viscoelastic state and may be more susceptible to contamination. Further, providing a clean (e.g., class 100) air source to provide air flowing through the first diffuser can reduce particles and/or debris on the surfaces of the glass ribbon. Providing an inert gas to flow through the first diffuser can prevent corrosion or other degradation of the glass manufacturing apparatus, which can reduce impurities in the glass ribbon from such byproducts. Controlling a flow rate of air through a first diffuser can reduce the velocity (e.g., average velocity, maximum velocity) of gas flowing through the first outlet cross-sectional area and/or reduce an intensity of currents of the gas that could interfere with the quality of the glass ribbon.

Embodiments of the disclosure can provide a glass forming apparatus comprising a first diffuser that can provide technical benefits. Providing the first diffuser with a larger first outlet cross-sectional area than the corresponding first inlet cross-sectional area can decrease a velocity (e.g., average velocity, maximum velocity) of gas flowing through the first outlet cross-sectional area, for example, about 10% or less than a velocity gas flowing through the first inlet cross-sectional area. Providing a diffuser in accordance with embodiments of the disclosure can decrease the maximum velocity (e.g., maximum outlet velocity) of gas flowing through the first outlet cross-sectional area, which can reduce an intensity of currents of the gas that could interfere with the quality of the glass ribbon. Providing the first diffuser can enable a low pressure drop (e.g., from about 100 Pascals or less) along a gas path through a first inlet and the first diffuser with at least two changes in direction of about 90° or more, which can increase an efficiency of the diffuser. Providing the gas path with at least two changes in direction of about 90° or more can provide room for positioning of cooling tubes or other apparatus near the first diffuser without collision, which can make efficiency use of the limited space within the housing. Further, the first diffuser and/or cooling tubes can be positioned within a first interior area, which can further protect the glass ribbon from currents of the gas. Providing the diffuser such that an angle an angle between the travel plane and a direction normal to the first outlet cross-sectional area can be about 45° or less can help protect the glass-forming ribbon from currents of gas from the first diffuser.

As used herein, the terms "the," "a," or "an," mean "at least one," and should not be limited to "only one" unless explicitly indicated to the contrary. Thus, for example, reference to "a component" comprises embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to comprise the specific value or endpoint referred to. If a numerical value or endpoint of a range in the specification recites "about," the numerical value or endpoint of a range is intended to comprise two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof, shall be construed as synonymous and open-ended, unless otherwise indicated. A list of elements following the transitional phrases comprising or including is a non-exclusive list, such that elements in addition to those specifically recited in the list may also be present.

While various embodiments have been described in detail with respect to certain illustrative and specific embodiments thereof, the present disclosure should not be considered limited to such, as numerous modifications and combinations of the disclosed features are possible without departing from the scope of the following claims.

What is claimed is:

1. A glass manufacturing apparatus comprising:

a forming body configured to draw a glass-forming ribbon along a travel plane in a travel direction, at least a portion of the forming body is positioned in an enclosure area bounded by at least an enclosure and a first housing, the first housing defining a first interior area in fluid communication with the enclosure area;

a first diffuser comprising a first inlet comprising a first inlet cross-sectional area and a first outlet comprising a first outlet cross-sectional area greater than the first inlet cross-sectional area, the first outlet positioned within the first interior area; and a gas source connected to the first inlet, wherein the gas source is configured to flow a first gas along a first gas path entering the first inlet, passing through the first diffuser, and exiting the first outlet into the first interior area to increase an enclosure pressure in the enclosure area.

2. The glass manufacturing apparatus of claim 1, further comprising an inlet conduit connecting the first inlet of the first diffuser to the gas source, wherein the first gas path further passes through the inlet conduit, and the first gas path undergoes at least two changes in direction of about 90° or more.

3. The glass manufacturing apparatus of claim 2, wherein a change in direction of the at least two changes in direction is positioned within the first diffuser.

4. The glass manufacturing apparatus of claim 1, wherein an area ratio of the first outlet cross-sectional area to the first inlet cross-sectional area is in a range from about 2 to about 60.

5. The glass manufacturing apparatus of claim 1, wherein a cross-sectional area of the first diffuser smoothly increases from the first inlet cross-sectional area to the first outlet cross-sectional area.

6. The glass manufacturing apparatus of claim 1, wherein an angle between the travel plane and a direction normal to the first outlet cross-sectional area is about 45° or less.

7. The glass manufacturing apparatus of claim 1, wherein the first diffuser is configured to change the direction of the first gas path as the first gas path exits the first outlet.

8. The glass manufacturing apparatus of claim 1, further comprising a plurality of cooling tubes, each cooling tube of the plurality of cooling tubes including a fluid outlet within the first interior area and positioned to direct a cooling fluid toward the travel plane.

9. The glass manufacturing apparatus of claim 7, wherein the first diffuser further comprises an end cap configured to facilitate the change in the direction of the first gas path as the first gas path exists the first outlet.

10. The glass manufacturing apparatus of claim 1, further comprising a second diffuser comprising a second inlet comprising a second inlet cross-sectional area, and a second outlet comprising a second outlet cross-sectional area greater than the second inlet cross-sectional area, the enclosure area further bounded by a second housing defining a second interior area in fluid communication with the enclosure area, and the second outlet is positioned within the second interior area of the second housing.

11. The glass manufacturing apparatus of claim 10, wherein the travel plane passes between the first housing and the second housing.

12. The glass manufacturing apparatus of claim 1, wherein the first gas path undergoes at least two changes in direction of about 90° or more when passing through the first diffuser.

* * * * *